US011300546B2

(12) United States Patent
Ueda et al.

(10) Patent No.: US 11,300,546 B2
(45) Date of Patent: Apr. 12, 2022

(54) DEFECT DETECTION DEVICE, DEFECT DETECTION METHOD, AND PROGRAM

(71) Applicant: NIPPON STEEL CORPORATION, Tokyo (JP)

(72) Inventors: Yoshio Ueda, Tokyo (JP); Kohei Okamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 132 days.

(21) Appl. No.: 16/769,925

(22) PCT Filed: Dec. 11, 2018

(86) PCT No.: PCT/JP2018/045430
§ 371 (c)(1),
(2) Date: Jun. 4, 2020

(87) PCT Pub. No.: WO2019/117120
PCT Pub. Date: Jun. 20, 2019

(65) Prior Publication Data
US 2021/0190731 A1    Jun. 24, 2021

(30) Foreign Application Priority Data

Dec. 12, 2017 (JP) .............................. JP2017-237672

(51) Int. Cl.
| G01N 29/04 | (2006.01) |
| G01N 29/44 | (2006.01) |
| G01N 29/07 | (2006.01) |

(52) U.S. Cl.
CPC ........... *G01N 29/07* (2013.01); *G01N 29/043* (2013.01); *G01N 29/4454* (2013.01); *G01N 2291/267* (2013.01)

(58) Field of Classification Search
CPC .. G01N 29/262; G01N 29/30; G01N 29/4463; G01N 29/4454; G01N 29/07;
(Continued)

(56) References Cited

U.S. PATENT DOCUMENTS 5,392,652 A * 2/1995 Levesque ............. G01N 29/043
73/629
5,583,292 A * 12/1996 Karbach .............. G01N 29/223
73/588

(Continued)

FOREIGN PATENT DOCUMENTS

| EP | 2 031 385 A1 | 3/2009 |
| EP | 2 570 806 A1 | 3/2013 |

(Continued)

OTHER PUBLICATIONS

International Search Report for PCT/JP2018/045430 dated Mar. 5, 2019.

(Continued)

*Primary Examiner* — Jacques M Saint Surin
(74) *Attorney, Agent, or Firm* — Birch, Stewart, Kolasch & Birch, LLP

(57) ABSTRACT

There are provided an ultrasonic waveform data generation unit (123) that generates ultrasonic waveform data representing amplitudes of reflected ultrasonic beams received by a reception unit (132) in time series for each of ultrasonic elements (111) forming reception ultrasonic elements (114), an ultrasonic waveform data processing unit (124) that uses a plurality of origin time adjustment patterns, in which a plurality of relative positional relationships between a phased array probe (110) and a welded portion (210) are set, and performs processing to synthesize pieces of the ultrasonic waveform data each having the adjusted origin time to generate synthesized ultrasonic waveform data according to each of the origin time adjustment patterns, and a defect (Continued)

evaluation unit (125) that evaluates whether or not a defect (211) is present in the welded portion (210) based on the synthesized ultrasonic waveform data.

9 Claims, 20 Drawing Sheets

(58) Field of Classification Search
CPC .. G01N 29/11; G01N 29/043; G01N 29/4472; G01N 2291/044; G01N 2291/015; G01N 2291/101; G01N 2291/2675; G01N 2291/267
USPC .......................................................... 73/623
See application file for complete search history.

(56) References Cited

U.S. PATENT DOCUMENTS

| | | | |
|---|---|---|---|
| 5,677,490 A | 10/1997 | Gunther et al. | |
| 7,293,461 B1* | 11/2007 | Girndt | G01N 29/04 310/336 |
| 8,266,964 B2* | 9/2012 | Iizuka | G01N 29/11 73/592 |
| 10,908,126 B2* | 2/2021 | Matsui | G01N 29/2487 |
| 2007/0056373 A1 | 3/2007 | Fischer et al. | |
| 2009/0151457 A1 | 6/2009 | Iizuka | |
| 2010/0107725 A1* | 5/2010 | Iizuka | G01N 29/11 73/1.82 |
| 2016/0025684 A1* | 1/2016 | Deneuville | G01N 29/2456 73/622 |

FOREIGN PATENT DOCUMENTS

| | | |
|---|---|---|
| JP | 7-27551 A | 1/1995 |
| JP | 2003-262622 A | 9/2003 |
| JP | 2004-28937 A | 1/2004 |
| JP | 2007-163470 A | 6/2007 |
| JP | 2011-227060 A | 11/2011 |
| JP | 2011-257384 A | 12/2011 |
| JP | 2016-38361 A | 3/2016 |
| WO | WO 94/19686 A1 | 9/1994 |
| WO | WO 2007/145200 A1 | 12/2007 |

OTHER PUBLICATIONS

Written Opinion of the International Searching Authority for PCT/JP2018/045430 (PCT/ISA/237) dated Mar. 5, 2019.

\* cited by examiner

ORIGIN TIME ADJUSTMENT PATTERN 11 (DEVIATION ANGLE=0°)

ORIGIN TIME ADJUSTMENT PATTERN 19 (DEVIATION ANGLE = −8°)

US 11,300,546 B2

DEFECT DETECTION DEVICE, DEFECT DETECTION METHOD, AND PROGRAM

TECHNICAL FIELD

The present invention relates to a defect detection device and a defect detection method that detect a defect present in a welded portion formed along a pipe longitudinal direction of a welded steel pipe, and a program for causing a computer to execute this defect detection method.

BACKGROUND ART

In a welded steel pipe such as an electric resistance welded steel pipe, the quality of a welded portion (weld surface) is extremely important. As an art to evaluate whether or not a defect is present in a welded portion of a welded steel pipe, there is an art described in Patent Literature 1, for example. Concretely, Patent Literature 1 describes an art in which ultrasonic beams are transmitted toward a welded portion through an outer surface of a welded steel pipe from a flaw detection ultrasonic element group consisting of some ultrasonic elements of a plurality of ultrasonic elements composing a phased array probe, the ultrasonic beams reflected on the welded steel pipe including the welded portion are received via the flaw detection ultrasonic element group, and based on the received ultrasonic beams, whether or not a defect is present in the welded portion is evaluated.

CITATION LIST

Patent Literature

Patent Literature 1: Japanese Laid-open Patent Publication No. 2016-38361

SUMMARY OF INVENTION

Technical Problem

When performing a defect inspection of a welded portion in a manufacturing process of a welded steel pipe, the position of the welded portion is sometimes deviated, (for example, the position of the welded portion is sometimes deviated in the circumferential direction of the welded steel pipe) depending on the welded steel pipe. Regarding this point, no consideration has been given to this positional deviation of the welded portion in the art described in Patent Literature 1. Therefore, the art described in Patent Literature 1 has caused a problem that the accuracy of detecting the defect decreases in the case where the position of the welded portion is deviated from an expected position.

The present invention has been made in consideration of such a problem, and an object thereof is to provide, when performing a defect inspection of a welded portion of a welded steel pipe using a phased array probe, a mechanism capable of suppressing a decrease in accuracy of detecting a defect in the case where the position of the welded portion is deviated from an expected position.

Solution To Problem

A defect detection device of the present invention is a defect detection device that detects a defect present in a welded portion formed along a pipe longitudinal direction of a welded steel pipe, the defect detection device including: a phased array probe that is installed outside an outer surface of the welded steel pipe and includes a plurality of ultrasonic elements arranged therein; a transmission means that transmits ultrasonic beams toward the welded portion through the outer surface of the welded steel pipe from the ultrasonic elements; a reception means that receives reflected ultrasonic beams being the ultrasonic beams reflected on the welded steel pipe including the welded portion by each of the ultrasonic elements; an ultrasonic waveform data generation means that generates ultrasonic waveform data representing amplitudes of the reflected ultrasonic beams received by the reception means in time series for each of the ultrasonic elements; an ultrasonic waveform data processing means that uses a plurality of origin time adjustment patterns, each being an origin time adjustment pattern for adjusting an origin time of the ultrasonic waveform data for each of the ultrasonic elements, in which a plurality of relative positional relationships between the phased array probe and the welded portion are set, and performs processing to synthesize pieces of the ultrasonic waveform data each having the adjusted origin time to generate synthesized ultrasonic waveform data according to each of the origin time adjustment patterns; and a defect evaluation means that evaluates whether or not the defect is present in the welded portion based on the synthesized ultrasonic waveform data.

Further, the present invention includes a defect detection method by the above-described defect detection device and a program for causing a computer to execute the defect detection method.

Advantageous Effects of Invention

According to the present invention, it is possible to, when performing a defect inspection of a welded portion of a welded steel pipe using a phased array probe, suppress a decrease in accuracy of detecting a defect in the case where the position of the welded portion is deviated from an expected position.

DESCRIPTION OF EMBODIMENTS

Hereinafter, there will be explained a mode for implementing the present invention (an embodiment) with reference to the drawings.

Figure 1:
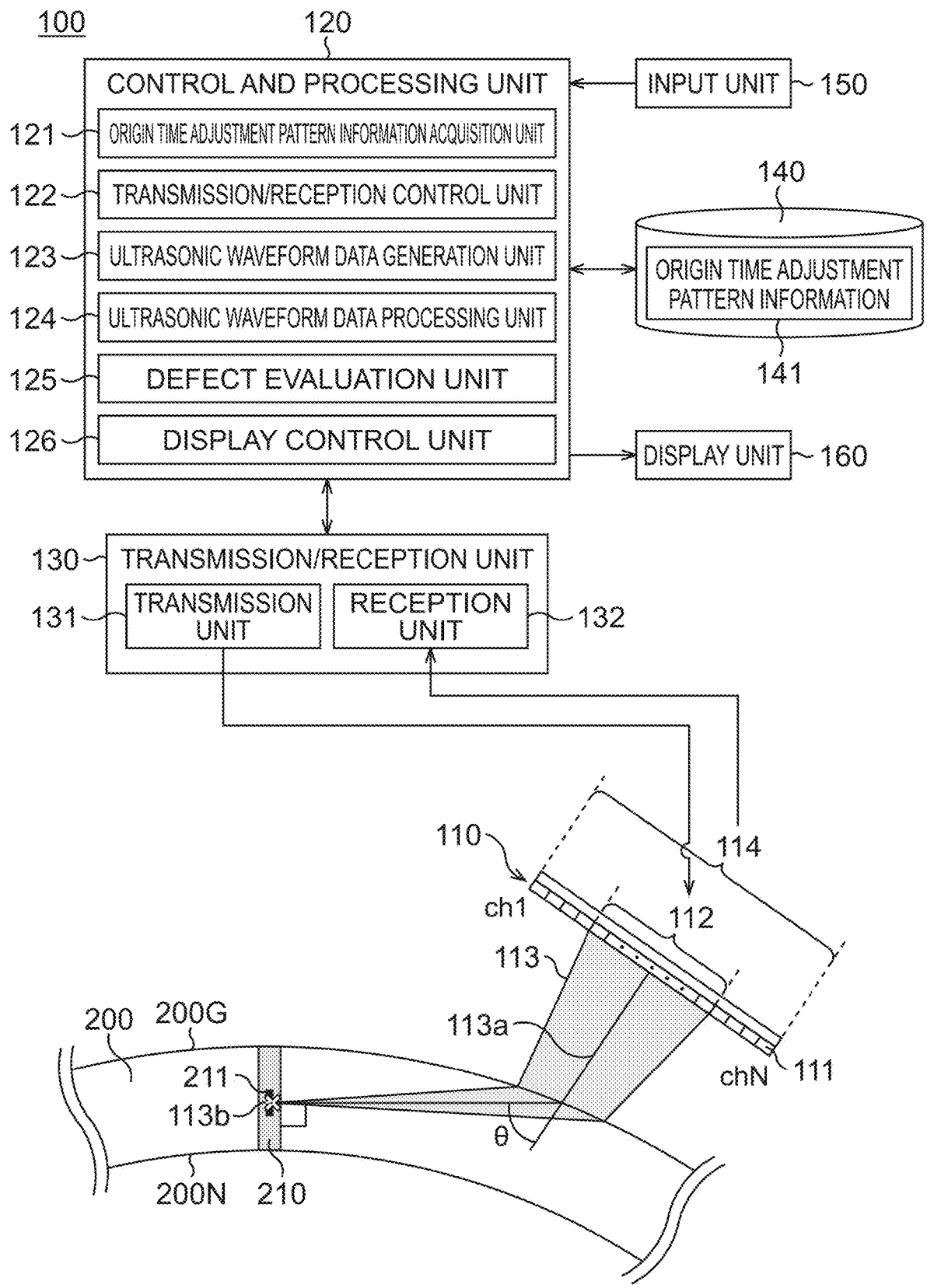
FIG. 1 is a view illustrating one example of a schematic configuration of a defect detection device according to an embodiment of the present invention.

FIG. 1 is a view illustrating one example of a schematic configuration of a defect detection device 100 according to the embodiment of the present invention. This defect detection device 100 is a device for detecting a defect 211 present in a welded portion (weld surface) 210 formed along a pipe longitudinal direction of a welded steel pipe 200 such as an electric resistance welded steel pipe. Further, FIG. 1 illustrates a cross section of the welded steel pipe 200 (the vicinity of the welded portion 210 of the cross section of the welded steel pipe 200 in more detail). Incidentally, the example where the defect 211 is present inside the welded portion 210 is illustrated in FIG. 1 in order to make the explanation easily understandable, but depending on the welded steel pipe 200, the defect 211 is sometimes not present inside the welded portion 210. Further, in this embodiment, the outside diameter of the welded steel pipe 200 is preferably 38.1 mm to 114.3 mm, for example, and the thickness (the length between an outer surface 200G and an inner surface 200N) of the welded steel pipe 200 is preferably 1.6 mm to 10 mm, for example.

The defect detection device 100 according to this embodiment is configured to include a phased array probe 110, a control and processing unit 120, a transmission/reception unit 130, a storage unit 140, an input unit 150, and a display unit 160 as illustrated in FIG. 1.

The phased array probe 110 is installed outside the outer surface 200G of the welded steel pipe 200 and is formed by having a plurality of ultrasonic elements 111 arranged therein. Concretely, FIG. 1 illustrates an example where as a plurality of the ultrasonic elements 111 composing the phased array probe 110, N pieces of ultrasonic elements of ch 1 to ch N are formed. Further, FIG. 1 illustrates, out of a plurality of the ultrasonic elements 111 composing the phased array probe 110, transmission ultrasonic elements 112 that transmit ultrasonic beams 113 toward the welded portion 210 through the outer surface 200G of the welded steel pipe 200. On this occasion, the ultrasonic beams 113 illustrated in FIG. 1 are illustrated so as to focus on one point (a focusing position 113b) of the welded portion 210, but this merely illustrates a path in terms of setting, and it is actually possible that the ultrasonic beams 113 do not focus on one point of the welded portion 210 depending on the specifications of the phased array probe 110 (for example, the width, frequency, number, or the like of the ultrasonic element 111). Therefore, in this embodiment, in the thickness direction of the welded steel pipe 200, a portion where the ultrasonic beams 113 focus on the welded portion 210 is described as a focusing region. Further, FIG. 1 illustrates, out of a plurality of the ultrasonic elements 111 composing the phased array probe 110, reception ultrasonic elements 114 that receive reflected ultrasonic beams being the ultrasonic beams 113 reflected on the welded steel pipe 200 including the welded portion 210 (to be sometimes described as "reflected ultrasonic beams" simply below). Further, between the phased array probe 110 and the outer surface 200G of the welded steel pipe 200, for example, water exists as a medium for efficiently propagating the ultrasonic beams 113.

The control and processing unit 120 controls configuration units of the defect detection device 100 and integrally controls operations of the defect detection device 100 based on input information input from the input unit 150, for example. Further, the control and processing unit 120 variously performs processing based on input information input from the input unit 150, for example. The control and processing unit 120 is configured to include an origin time adjustment pattern information acquisition unit 121, a transmission/reception control unit 122, an ultrasonic waveform data generation unit 123, an ultrasonic waveform data processing unit 124, a defect evaluation unit 125, and a display control unit 126 as illustrated in FIG. 1.

The origin time adjustment pattern information acquisition unit 121 acquires, based on input information input from the input unit 150, for example, origin time adjustment pattern information 141 stored in the storage unit 140. The origin time adjustment pattern information 141 acquired in the origin time adjustment pattern information acquisition unit 121 includes a plurality of origin time adjustment patterns, each being an origin time adjustment pattern for adjusting an origin time of ultrasonic waveform data for each of the ultrasonic elements 111 forming the reception ultrasonic elements 114, in which a plurality of relative positional relationships between the phased array probe 110 and the welded portion 210 are set. Here, in this description, the "origin time" is a time indicating a starting point of each received waveform when synthesizing received waveforms and is a time when a predetermined time has elapsed from a starting point of transmission or reception of the ultrasonic beam 113.

The transmission/reception control unit 122 controls the transmission/reception unit 130 based on input information input from the input unit 150, for example. Concretely, the transmission/reception control unit 122 performs setting of the transmission ultrasonic element 112 and setting of the reception ultrasonic element 114 based on input information input from the input unit 150, for example.

Further, the transmission/reception control unit 122 sets a transmission delay pattern by the transmission ultrasonic element 112 and an origin time adjustment pattern by the reception ultrasonic element 114 considering the following elements, for example.

The number (n) of transmission ultrasonic elements 112
The number (m) of reception ultrasonic elements 114
The outside diameter of the welded steel pipe 200
The thickness (length between the outer surface 200G and the inner surface 200N) of the welded steel pipe 200
The geometric positional relationship between the phased array probe 110 and the welded steel pipe 200
The angle θ and the focusing position 113b of the ultrasonic beams 113
The specifications (frequency, pitch, element number, element size, and so on) of the phased array probe 110
Physical property values of a medium (water) present between the phased array probe 110 and the outer surface 200G of the welded steel pipe 200 (a sound propagation speed of the ultrasonic beam 113, and so on)
Physical property values of a steel product of the welded steel pipe 200 (a sound propagation speed of the ultrasonic beam 113, and so on)

Further, in this embodiment, the position of the phased array probe 110 is set in the following manner, for example.

First, based on the determined focusing position 113b of the ultrasonic beams 113, a line orthogonal to the welded portion 210 is extended toward the outer surface 200G of the welded steel pipe 200. Then, the line is extended in the direction of the phased array probe 110 at the angle θ of refraction based on Snell's law at the outer surface 200G of the welded steel pipe 200. Then, the phased array probe 110 is arranged so that the center of the phased array probe 110 can be located on the extension of the line and the extended line and an arrangement surface of the ultrasonic elements 111 can intersect at right angles.

Further, the distance (water distance) between the phased array probe 110 and the outer surface 200G of the welded steel pipe 200 is determined in consideration of an inspection time to be affected by a propagation time of the reflected ultrasonic beams from the defect 211 present in the welded portion 210 (in which the propagation time, namely, the inspection time becomes long when the water distance is long), the fact that the effect of reverberation echoes going and returning between the phased array probe 110 and the outer surface 200G of the welded steel pipe 200 is ignorable, or the like.

The ultrasonic waveform data generation unit 123 generates ultrasonic waveform data representing amplitudes of the reflected ultrasonic beams received in a reception unit 132 in time series for each of the ultrasonic elements 111 forming the reception ultrasonic elements 114.

The ultrasonic waveform data processing unit 124 variously performs processing on the ultrasonic waveform data generated in the ultrasonic waveform data generation unit 123. Concretely, the ultrasonic waveform data processing unit 124 uses a plurality of the origin time adjustment patterns acquired in the origin time adjustment pattern information acquisition unit 121, adjusts the origin time of each of the ultrasonic waveform data generated for each of the ultrasonic elements 111 forming the reception ultrasonic elements 114 in the ultrasonic waveform data generation unit 123 according to each of the origin time adjustment patterns, and performs processing to synthesize pieces of the ultrasonic waveform data each having the adjusted origin time, to thereby generate synthesized ultrasonic waveform data. Further, the ultrasonic waveform data processing unit 124 variously performs processing on the synthesized ultrasonic waveform data generated according to each of the origin time adjustment patterns.

The defect evaluation unit 125 evaluates whether or not the defect 211 is present in the welded portion 210 based on the synthesized ultrasonic waveform data generated according to each of the origin time adjustment patterns in the ultrasonic waveform data processing unit 124.

The display control unit 126 performs a control of displaying a evaluation result of the defect 211 by the defect evaluation unit 125 on the display unit 160. Further, the display control unit 126 performs a control of displaying various pieces of information on the display unit 160 as necessary.

The transmission/reception unit 130 transmits and receives ultrasonic beams to and from the welded steel pipe 200 based on the control of the transmission/reception control unit 122. The transmission/reception unit 130 is configured to include a transmission unit 131 and the reception unit 132. The transmission unit 131 performs processing to transmit the ultrasonic beams 113 from the transmission ultrasonic elements 112 set in the transmission/reception control unit 122. In this embodiment, the transmission unit 131 performs processing to transmit the ultrasonic beams 113 from the transmission ultrasonic elements 112 to make the ultrasonic beams 113 that have entered the welded steel pipe through the outer surface 200G of the welded steel pipe 200 directly incident on the welded portion 210 substantially vertically without reflecting on the inner surface 200N of the welded steel pipe 200 to focus on the welded portion 210 based on the control of the transmission/reception control unit 122. Concretely, in this embodiment, the transmission unit 131 transmits the ultrasonic beam 113 from the transmission ultrasonic element 112 to refract the ultrasonic beam 113 at an angle θ (about 70° in the example illustrated in FIG. 1) relative to an incident axis 113a on the outer surface 200G of the welded steel pipe 200 and make it directly incident on the welded portion 210 substantially vertically without reflecting on the inner surface 200N of the welded steel pipe 200. Further, the reception unit 132 performs processing to receive the reflected ultrasonic beams by each of the ultrasonic elements 111 forming the reception ultrasonic elements 114 set in the transmission/reception control unit 122.

The storage unit 140 stores the origin time adjustment pattern information 141 including a plurality of the origin time adjustment patterns, each being an origin time adjustment pattern for adjusting the origin time of the ultrasonic waveform data for each of the ultrasonic elements 111 forming the reception ultrasonic elements 114, in which a plurality of relative positional relationships between the phased array probe 110 and the welded portion 210 are set. A plurality of the origin time adjustment patterns included in the origin time adjustment pattern information 141 will be explained while using FIG. 4 to FIG. 7. Further, the storage unit 140 stores various pieces of information, programs, and so on to be used in the control and processing unit 120 and various pieces of information and so on obtained by processing of the control and processing unit 120.

The input unit 150 inputs input information operation input by a user, for example, to the control and processing unit 120.

The display unit 160 displays a evaluation result of the defect 211 by the defect evaluation unit 125 based on the control of the display control unit 126. Further, the display unit 160 displays various pieces of information based on the control of the display control unit 126.

Next, there will be explained positional deviation of the welded portion 210 in the circumferential direction of the welded steel pipe 200 using FIG. 2A to FIG. 2C and FIG. 3A and FIG. 3B.

Figure 2A:
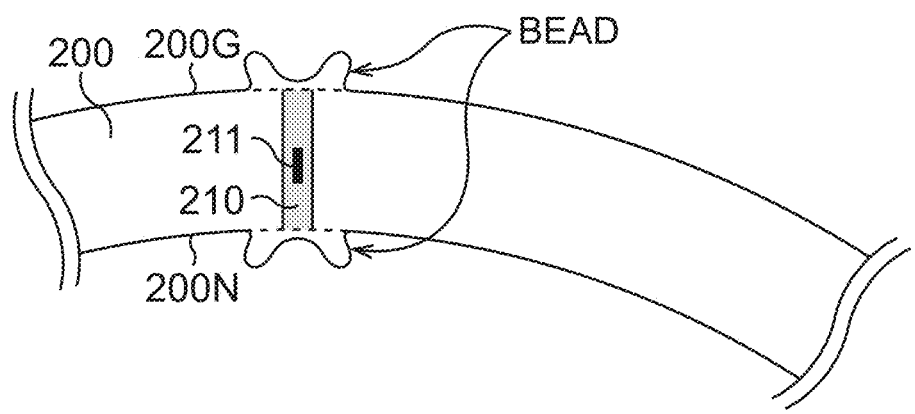
FIG. 2A is a view illustrating the embodiment of the present invention and illustrating one example of a method of determining a position of a welded portion illustrated in FIG. 1.
Figure 2B:
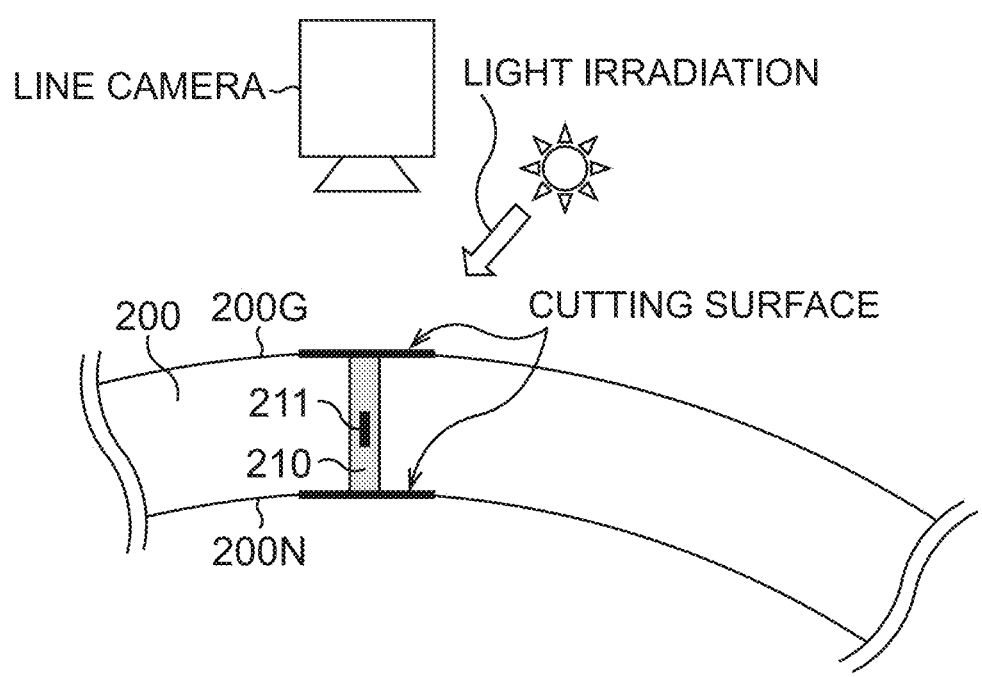
FIG. 2B is a view illustrating the embodiment of the present invention and illustrating one example of the method of determining the position of the welded portion illustrated in FIG. 1.
Figure 2C:
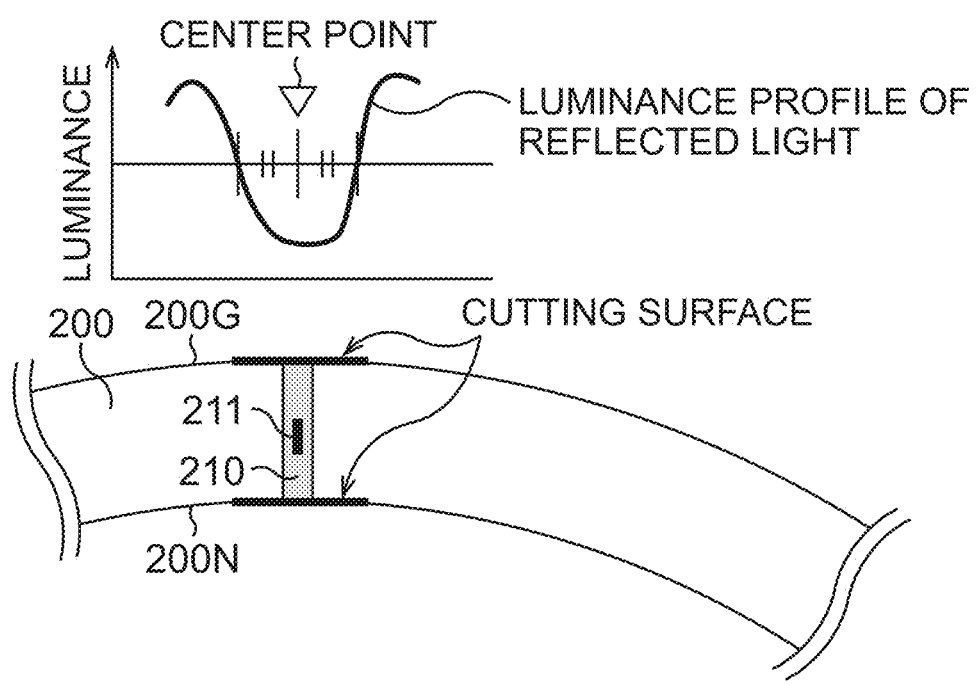
FIG. 2C is a view illustrating the embodiment of the present invention and illustrating one example of the method of determining the position of the welded portion illustrated in FIG. 1.

FIG. 2A to FIG. 2C each are a view illustrating the embodiment of the present invention and illustrating one example of a method of determining the position of the welded portion 210 illustrated in FIG. 1. FIG. 2A is a schematic view illustrating one example of the case where for example, a band-shaped steel sheet (band steel) is welded at the welded portion 210 to manufacture the welded steel pipe 200. As illustrated in FIG. 2A, at the time of welding, protuberant portions called beads are formed on the welded portion 210.

FIG. 2B is a view illustrating a state where the beads illustrated in FIG. 2A are cut, light irradiation is performed on a cutting surface, and then a line camera photographs the cutting surface as one example for determining the position of the welded portion 210. Further, FIG. 2C is a view illustrating one example of a luminance profile of an image of the cutting surface photographed by the line camera illustrated in FIG. 2B. On this occasion, at the center point of the cutting surface, the luminance decreases due to the reason that the emitted light more irregularly reflects or the like, so that in the example illustrated in FIG. 2C, the position where the luminance most decreases is determined as the position of the welded portion 210. That is, FIG. 2C illustrates an example where the center point of a cut width of the cutting surface is determined as the position of the welded portion 210. The reason why the position of the welded portion 210 is determined by the method illustrated in FIG. 2A to FIG. 2C is because it is difficult to directly measure the position of the welded portion 210 after cutting the beads and determine the position in many cases.

Figure 3A:
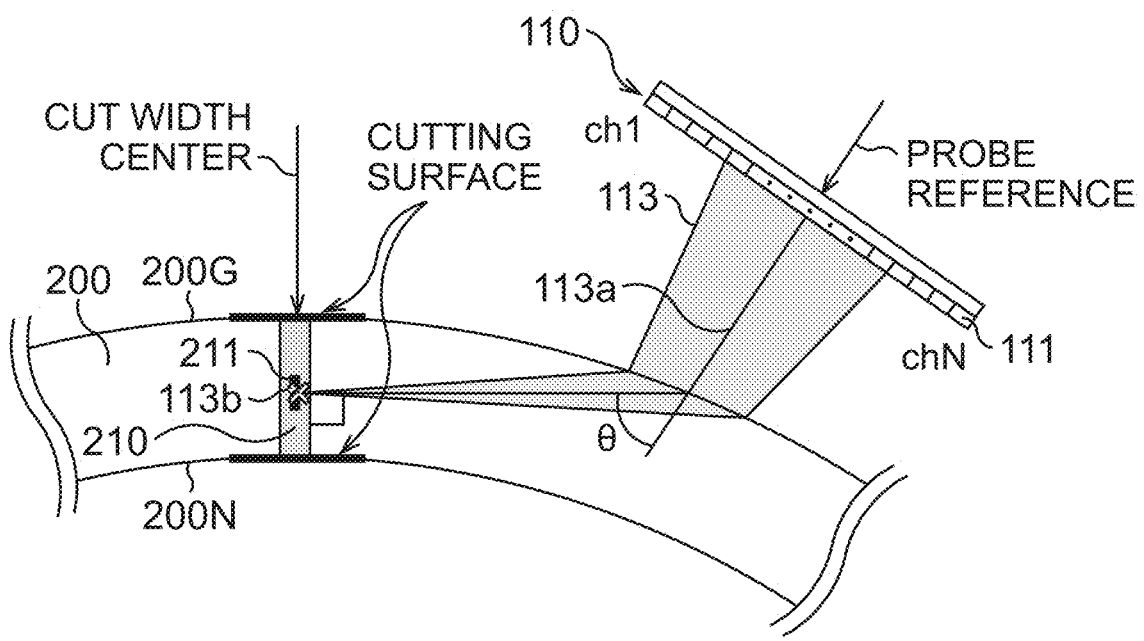
FIG. 3A is a view illustrating a state of the case where ultrasonic beams are transmitted to the position of the welded portion determined by the method illustrated in FIG. 2C from a phased array probe illustrated in FIG. 1.
Figure 3B:
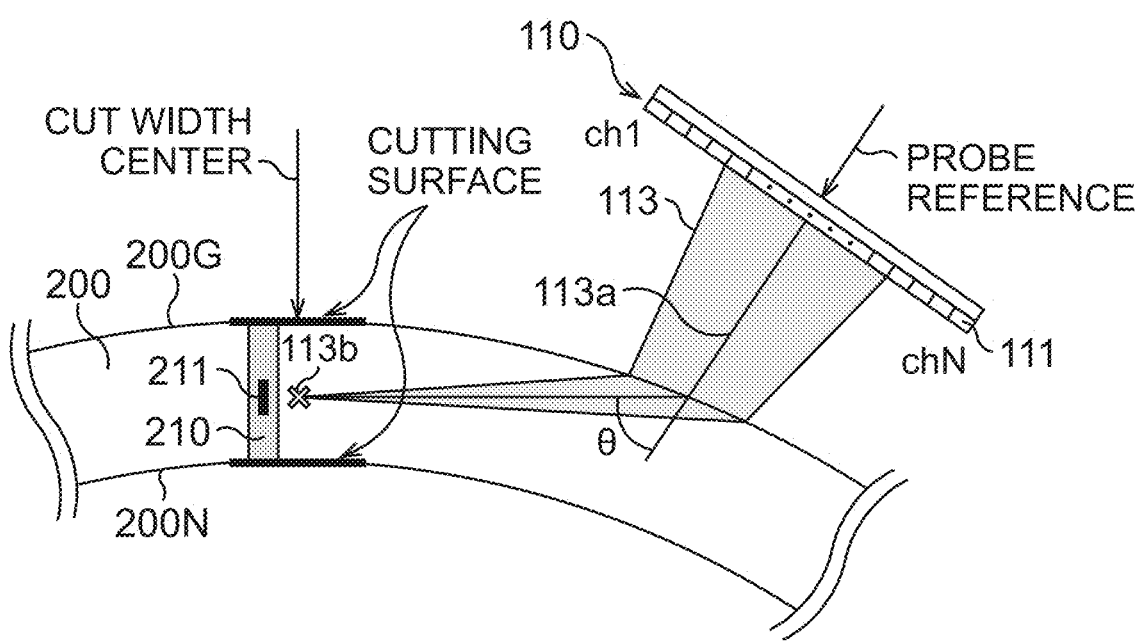
FIG. 3B is a view illustrating a state of the case where the ultrasonic beams are transmitted to the position of the welded portion determined by the method illustrated in FIG. 2C from the phased array probe illustrated in FIG. 1.

FIG. 3A and FIG. 3B each are a view illustrating a state of the case where the ultrasonic beams 113 are transmitted to the position of the welded portion 210 determined by the method illustrated in FIG. 2C from the phased array probe 110 illustrated in FIG. 1. FIG. 3A illustrates the case where the welded portion 210 is actually located at the position (cut width center) of the welded portion 210 determined by the method illustrated in FIG. 2C. In the case illustrated in FIG. 3A, the welded portion 210 is actually located at the position of the welded portion 210 determined by the method illustrated in FIG. 2C, so that it is possible to set the focusing position 113b of the ultrasonic beams 113 at the actual position of the welded portion 210 by performing a control so that the ultrasonic beams 113 focus on the position of the welded portion 210 determined by the method illustrated in FIG. 2C. In contrast to this, FIG. 3B illustrates the case where the actual position of the welded portion 210 is deviated in the circumferential direction of the welded steel pipe 200 from the position of the welded portion 210 (cut width center) determined by the method illustrated in FIG. 2C. In the case illustrated in FIG. 3B, the actual position of the welded portion 210 is deviated in the circumferential direction of the welded steel pipe 200 from the position of the welded portion 210 determined by the method illustrated in FIG. 2C, so that it is impossible to set the focusing position 113b of the ultrasonic beams 113 at the actual position of the welded portion 210 when performing a control so that the ultrasonic beams 113 focus on the position of the welded portion 210 determined by the method illustrated in FIG. 2C. Therefore, in the case illustrated in FIG. 3B, a decrease in accuracy of detecting the defect 211 is concerned. Then, in order to suppress the decrease in accuracy of detecting the defect 211 in the case illustrated in FIG. 3B, this embodiment is designed to use a plurality of the origin time adjustment patterns in which a plurality of the relative positional relationships between the phased array probe 110 and the welded portion 210 are set, adjust the origin time of each of the ultrasonic waveform data generated for each of the ultrasonic elements 111 forming the reception ultrasonic elements 114 in the ultrasonic waveform data generation unit 123 according to each of the origin time adjustment patterns, synthesize pieces of the ultrasonic waveform data each having the adjusted origin time to generate the synthesized ultrasonic waveform data, and evaluate whether or not the defect 211 is present in the welded portion 210 based on the synthesized ultrasonic waveform data generated according to each of the origin time adjustment patterns.

Then, the origin time adjustment pattern information 141 stored in the storage unit 140 will be explained while using FIG. 4 to FIG. 7.

Figure 4:
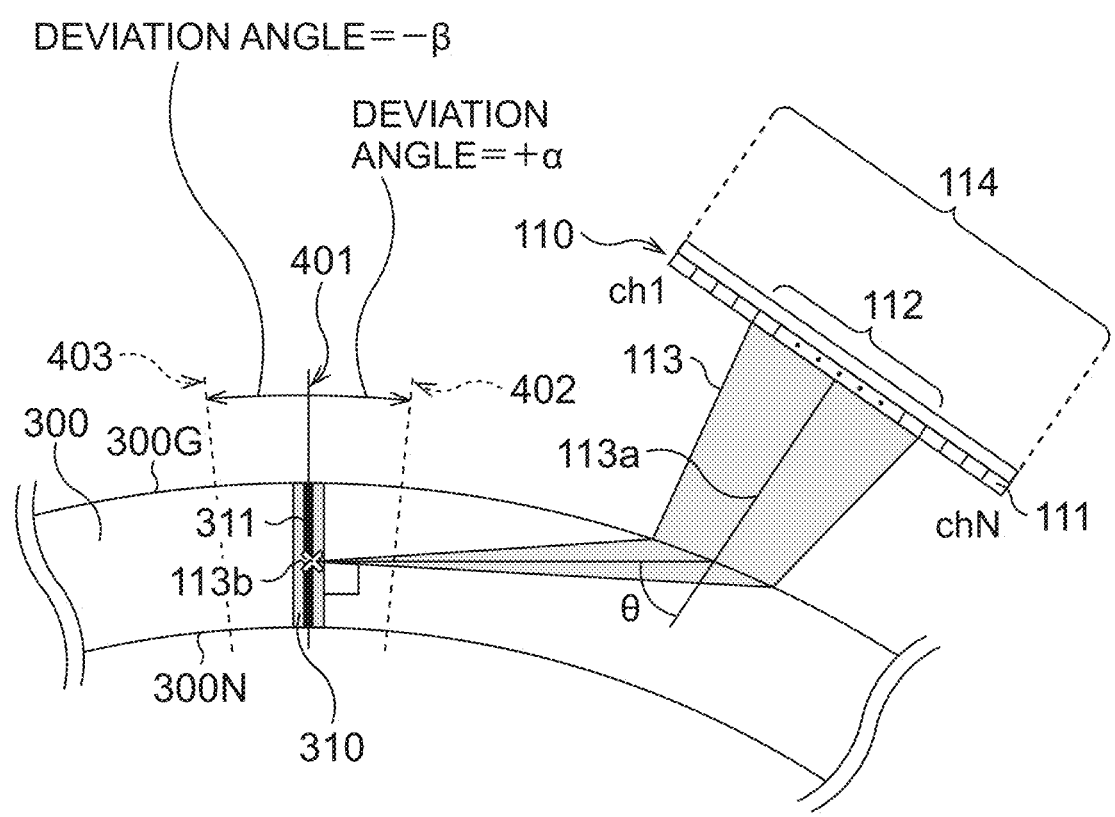
FIG. 4 is a view illustrating the embodiment of the present invention and illustrating one example of acquisition processing of a plurality of origin time adjustment patterns included in origin time adjustment pattern information stored in a storage unit in FIG. 1.

FIG. 4 is a view illustrating the embodiment of the present invention and illustrating one example of acquisition processing of a plurality of the origin time adjustment patterns included in the origin time adjustment pattern information 141 stored in the storage unit 140 in FIG. 1. In this embodiment, a calibration pipe 300 illustrated in FIG. 4 is used when acquiring a plurality of the origin time adjustment patterns.

The calibration pipe 300 illustrated in FIG. 4 is a steel pipe for calibrating the welded steel pipe 200 illustrated in FIG. 1 and is a steel pipe with an artificial defect 311 formed in a second welded portion 310 equivalent to the welded portion 210 of the welded steel pipe 200. On this occasion, as the artificial defect 311, a through hole having a predetermined size is formed. Further, in FIG. 4, an outer surface 300G of the calibration pipe 300 and an inner surface 300N of the calibration pipe 300 are also illustrated.

FIG. 4 is a view illustrating a state of transmitting the ultrasonic beams 113 to the calibration pipe 300 for calibrating the welded steel pipe 200 in FIG. 1 from the transmission ultrasonic elements 112 of the phased array probe 110 in FIG. 1. FIG. 4 also illustrates the case where the position of the second welded portion 310 is deviated in the circumferential direction of the calibration pipe 300, in which relative to the phased array probe 110, a reference position of the second welded portion 310 is set as a first position 401, a position where the position of the second welded portion 310 is deviated clockwise from the first position 401 in the circumferential direction of the calibration pipe 300 by an angle α (an angle +α when the clockwise rotation is set as the + direction) is set as a second position 402, and a position where the position of the second welded portion 310 is deviated counterclockwise from the first position 401 in the circumferential direction of the calibration pipe 300 by an angle β (an angle −β when the clockwise rotation is set as the + direction) is set as a third position 403. Further, the focusing position 113b of the ultrasonic beams 113 is set to be located at the second welded portion 310 when the second welded portion 310 is located at the first position 401.

Here, in this embodiment, the phased array probe 110 is composed to include 64 pieces of the ultrasonic elements 111 of ch 1 to ch 64. Further, the transmission ultrasonic elements 112 are formed of 24 pieces (ch 21 to ch 44) of the ultrasonic elements 111, being some of the ultrasonic elements 111, out of 64 pieces of the ultrasonic elements 111 composing the phased array probe 110. Then, this embodiment can also include a mode in which the reception ultrasonic elements 114 are formed of n pieces of the ultrasonic elements 111 (concretely, 24 pieces of ch 21 to ch 44), which is the same number as the transmission ultrasonic elements 112, out of 64 pieces of the ultrasonic elements 111 composing the phased array probe 110, but preferably employs a mode in which the reception ultrasonic elements 114 are formed of m pieces, being larger than n pieces, of the ultrasonic elements 111 including n pieces of the above-described ultrasonic elements 111 (ch 21 to ch 44) forming the transmission ultrasonic elements 112. As above, the reception ultrasonic elements 114 are formed of a number, being larger than the number of ultrasonic elements forming the transmission ultrasonic elements 112, of ultrasonic elements including the ultrasonic elements forming the transmission ultrasonic elements 112, and thereby it is possible to expect further suppression of the decrease in accuracy of detecting the defect as compared to the case where the ultrasonic elements forming the transmission ultrasonic elements 112 are formed as the reception ultrasonic elements 114, for example. Further, the present inventor has learned that in each of the case where the reception ultrasonic elements 114 are formed of 24 pieces of the ultrasonic elements 111 (ch 21 to ch 44), the case where the reception ultrasonic elements 114 are formed of 32 pieces of the ultrasonic elements 111 (ch 17 to ch 48), the case where the reception ultrasonic elements 114 are formed of 48 pieces of the ultrasonic elements 111 (ch 9 to ch 56), and the case where the reception ultrasonic elements 114 are forme of 64 pieces of the ultrasonic elements 111 (ch 1 to ch 64) under the condition that the transmission ultrasonic elements 112 are formed of 24 pieces of the ultrasonic elements 111 (ch 21 to ch 44), the case where the reception ultrasonic elements 114 are formed of 64 pieces of the ultrasonic elements 111 (ch 1 to ch 64) is the most excellent from a viewpoint of an SN ratio when the position of the welded portion 210 is deviated in the circumferential direction of the welded steel pipe 200. Therefore, in the explanation of this embodiment to be described below, the explanation will be made provided that the reception ultrasonic elements 114 are formed of all 64 pieces of the ultrasonic elements 111 (ch 1 to ch 64) out of 64 pieces of the ultrasonic elements 111 composing the phased array probe 110.

Figure 5A:
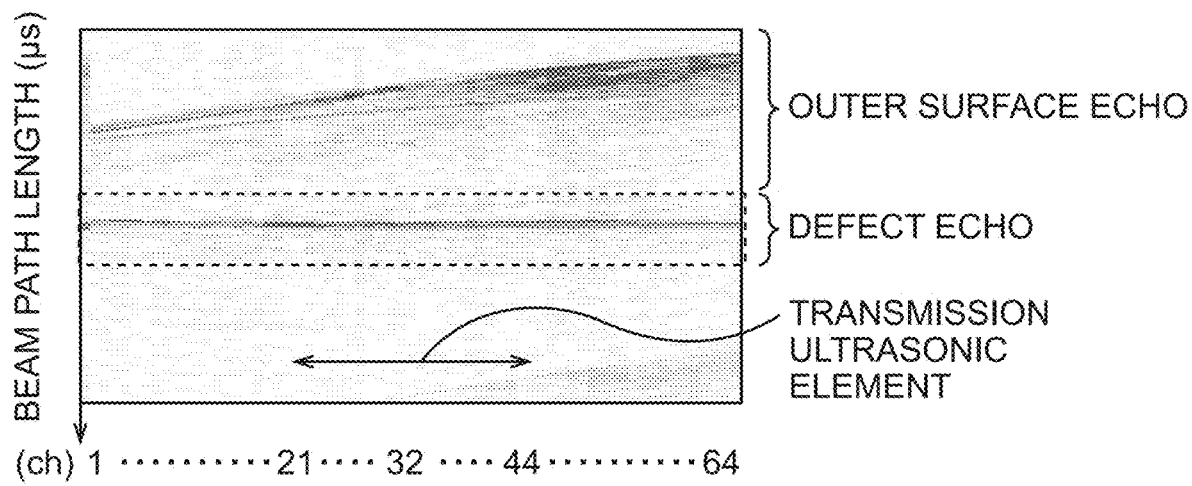
FIG. 5A is a view illustrating one example of characteristics of reception ultrasonic elements that have received reflected ultrasonic beams in the case of a deviation angle illustrated in FIG. 4 being 0°.
Figure 5B:
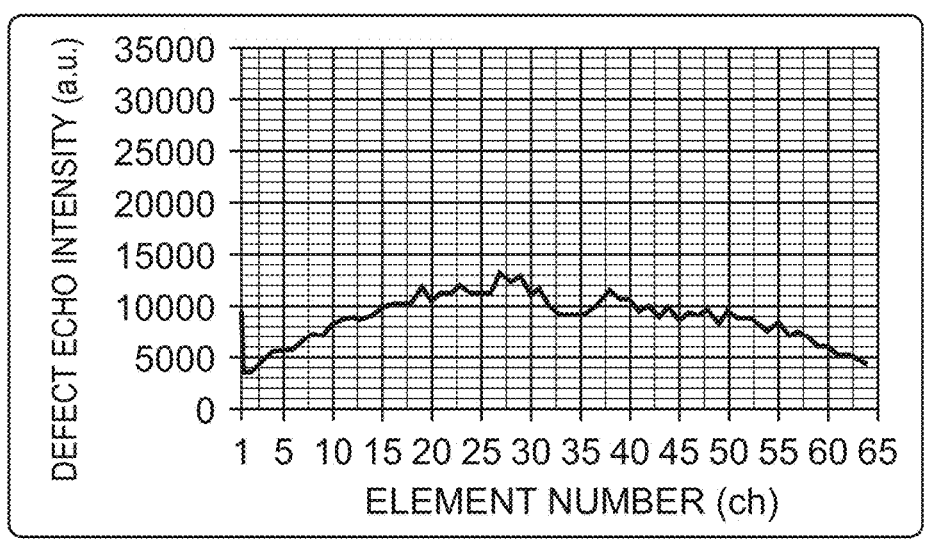
FIG. 5B is a view illustrating one example of the characteristics of the reception ultrasonic elements that have received the reflected ultrasonic beams in the case of the deviation angle illustrated in FIG. 4 being 0°.
Figure 5C:
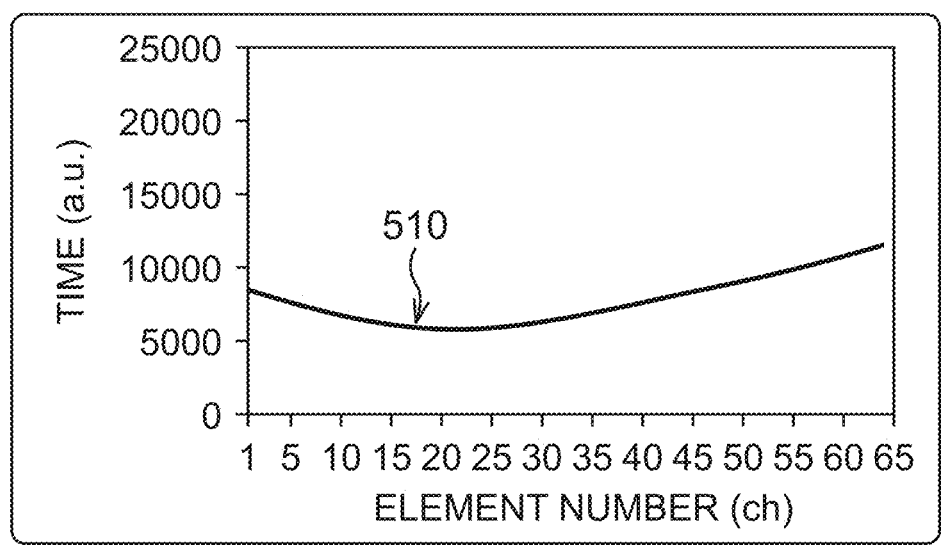
FIG. 5C is a view illustrating one example of the characteristics of the reception ultrasonic elements that have received the reflected ultrasonic beams in the case of the deviation angle illustrated in FIG. 4 being 0°.

FIG. 5A to FIG. 5C are views illustrating one example of characteristics of the reception ultrasonic elements 114 that have received the reflected ultrasonic beams in the case of the deviation angle illustrated in FIG. 4 being 0°.

Concretely, FIG. 5A is a view illustrating one example of a B scanned image relating to the reflected ultrasonic beams received by the ultrasonic elements 111 forming the reception ultrasonic elements 114 of ch 1 to ch 64 after the transmission ultrasonic elements 112 of ch 21 to ch 44 transmit the ultrasonic beams 113 in the case of the deviation angle illustrated in FIG. 4 being 0°. In FIG. 5A, the horizontal axis indicates element numbers (ch 1 to ch 64) of the ultrasonic elements 111 forming the reception ultrasonic elements 114 and the vertical axis indicates a beam path length (μs) of the reflected ultrasonic beam.

In FIG. 5A, a colored portion in a region described as an outer surface echo indicates that the ultrasonic elements 111 forming the reception ultrasonic elements 114 each have received the reflected ultrasonic beam from the outer surface 300G of the calibration pipe 300. Further, in FIG. 5A, a colored portion in a region described as a defect echo indicates that the ultrasonic elements 111 forming the reception ultrasonic elements 114 each have received the reflected ultrasonic beam from the artificial defect 311 (an artificial defect reflected ultrasonic beam).

FIG. 5B is a characteristic view in which the maximum signal intensity of the defect echos received by the ultrasonic elements 111 (with the element numbers of 1 ch to 64 ch) forming the reception ultrasonic elements 114 in the case of FIG. 5A is illustrated as a defect echo intensity in the case of the deviation angle illustrated in FIG. 4 being 0°. Concretely, in FIG. 5B, the horizontal axis indicates the element numbers (ch 1 to ch 64) of the ultrasonic elements 111 forming the reception ultrasonic elements 114 and the vertical axis indicates the defect echo intensity.

FIG. 5C is a characteristic view illustrating a defect echo appearance time on the ultrasonic waveform data of the ultrasonic elements 111 (with the element numbers of 1 ch to 64 ch) forming the reception ultrasonic elements 114 in the case of FIG. 5B in the case of the deviation angle illustrated in FIG. 4 being 0°. Concretely, in FIG. 5C, the horizontal axis indicates the element numbers (ch 1 to ch 64) of the ultrasonic elements 111 forming the reception ultrasonic elements 114 and the vertical axis indicates the defect echo appearance time (time) on the ultrasonic waveform data. Further, the time indicated on the vertical axis indicates an elapsed time from a reference time point. Here, in this description, the "reference time point" is a point of time when a predetermined time has elapsed from the starting point of transmission or reception of the ultrasonic beam 113 in the ultrasonic waveform data processing unit 124.

Figure 6A:
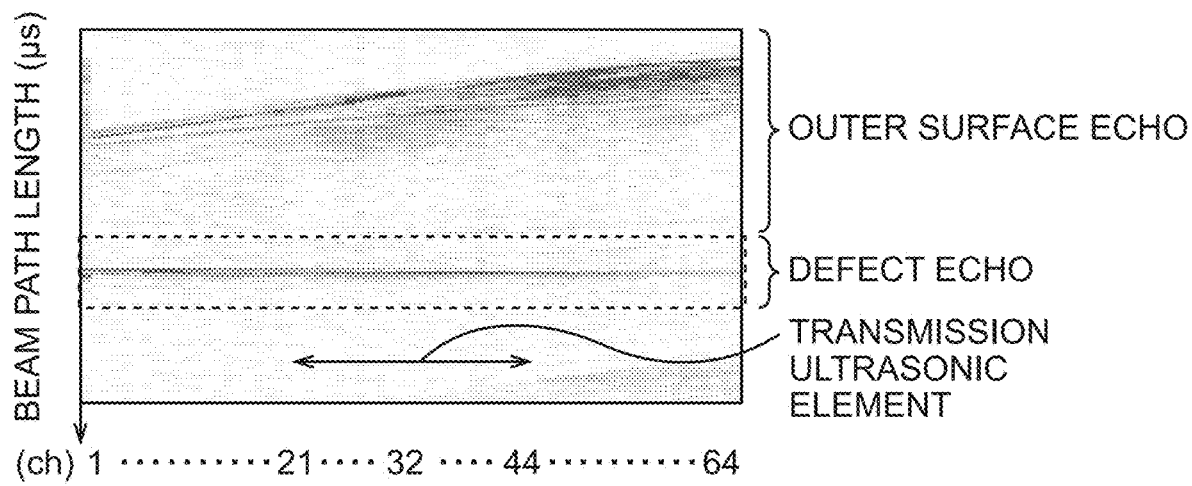
FIG. 6A is a view illustrating one example of the characteristics of the reception ultrasonic elements that have received reflected ultrasonic beams in the case of the deviation angle illustrated in FIG. 4 being −8° (β=8).
Figure 6B:
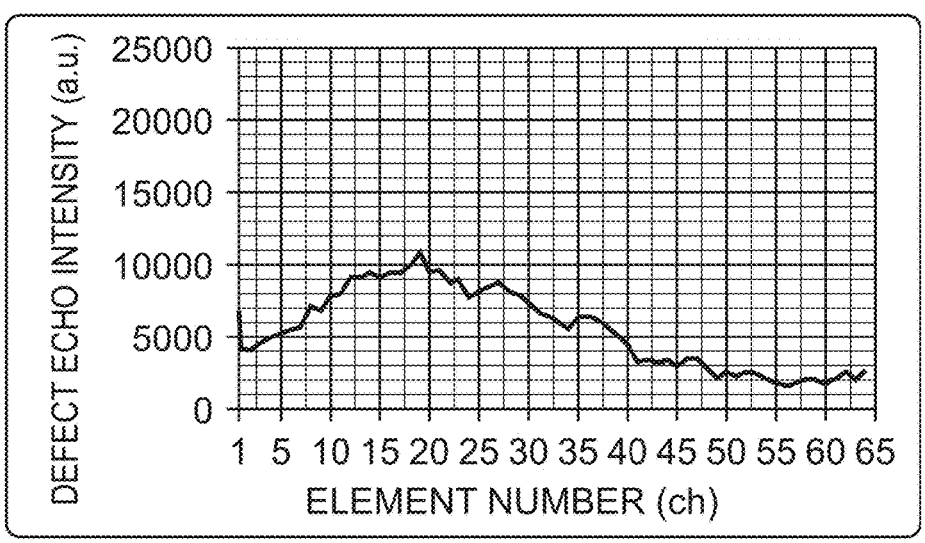
FIG. 6B is a view illustrating one example of the characteristics of the reception ultrasonic elements that have received the reflected ultrasonic beams in the case of the deviation angle illustrated in FIG. 4 being −8° (β=8).
Figure 6C:
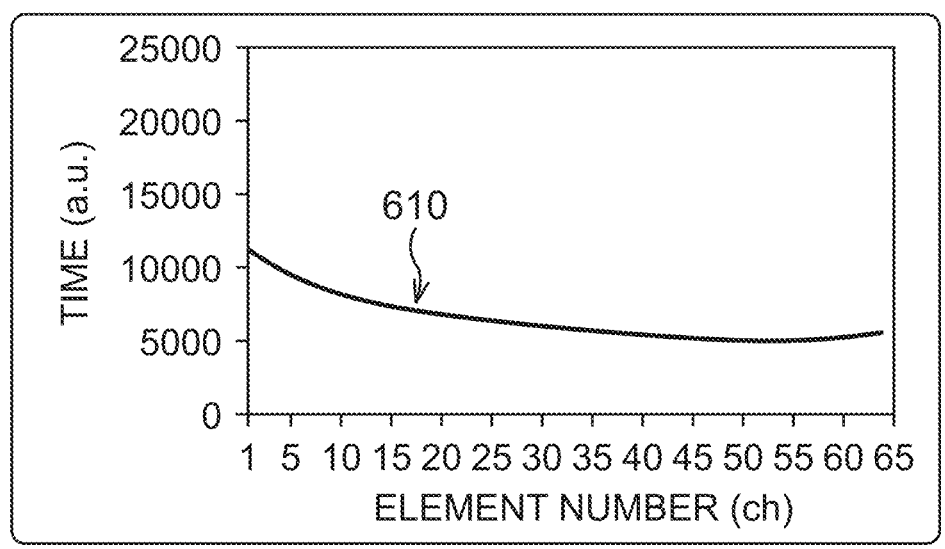
FIG. 6C is a view illustrating one example of the characteristics of the reception ultrasonic elements that have received the reflected ultrasonic beams in the case of the deviation angle illustrated in FIG. 4 being −8° (β=8).

FIG. 6A to FIG. 6C are views illustrating one example of characteristics of the reception ultrasonic elements 114 that have received the reflected ultrasonic beam in the case of the deviation angle illustrated in FIG. 4 being −8° (β=8).

Concretely, FIG. 6A is a view illustrating one example of a B scanned image relating to the reflected ultrasonic beams received by the ultrasonic elements 111 forming the reception ultrasonic elements 114 of ch 1 to ch 64 after the transmission ultrasonic elements 112 of ch 21 to ch 44 transmit the ultrasonic beams 113 in the case of the deviation angle illustrated in FIG. 4 being −8°. In FIG. 6A as well, similarly to FIG. 5A, the horizontal axis indicates the element numbers (ch 1 to ch 64) of the ultrasonic elements 111 forming the reception ultrasonic elements 114 and the vertical axis indicates the beam path length (µs) of the reflected ultrasonic beam.

In FIG. 6A, a colored portion in a region described as an outer surface echo indicates that the ultrasonic elements 111 forming the reception ultrasonic elements 114 each have received the reflected ultrasonic beam from the outer surface 300G of the calibration pipe 300. Further, in FIG. 6A, a colored portion in a region described as a defect echo indicates that the ultrasonic elements 111 forming the reception ultrasonic elements 114 each have received the reflected ultrasonic beam from the artificial defect 311 (an artificial defect reflected ultrasonic beam).

FIG. 6B is a characteristic view in which the maximum signal intensity of the defect echos received by the ultrasonic elements 111 (with the element numbers of 1 ch to 64 ch) forming the reception ultrasonic elements 114 in the case of FIG. 6A is illustrated as a defect echo intensity in the case of the deviation angle illustrated in FIG. 4 being −8°. In FIG. 6B as well, similarly to FIG. 5B, the horizontal axis indicates the element numbers (ch 1 to ch 64) of the ultrasonic elements 111 forming the reception ultrasonic elements 114 and the vertical axis indicates the defect echo intensity.

FIG. 6C is a characteristic view illustrating a defect echo appearance time on the ultrasonic waveform data of the ultrasonic elements 111 (with the element numbers of 1 ch to 64 ch) forming the reception ultrasonic elements 114 in the case of FIG. 6B in the case of the deviation angle illustrated in FIG. 4 being −8°. In FIG. 6C as well, similarly to FIG. 5C, the horizontal axis indicates the element numbers (ch 1 to ch 64) of the ultrasonic elements 111 forming the reception ultrasonic elements 114 and the vertical axis indicates the defect echo appearance time (time) on the ultrasonic waveform data. Further, the time indicated on the vertical axis indicates an elapsed time from a reference time point.

Here, an explanation will be made with comparisons between FIG. 5A to FIG. 5C and FIG. 6A to FIG. 6C.

The comparison between FIG. 5B and FIG. 6B reveals that the ultrasonic elements 111 (with the element numbers of 1 ch to 64 ch) forming the reception ultrasonic elements 114 have received a sufficient defect echo intensity even in the case of the deviation angle in FIG. 6B being large (the deviation angle=−8°). Further, the comparison between FIG. 5C and FIG. 6C reveals that peaks of their profiles are deviated and their profiles are different greatly.

Then, the present inventor conceived that the profile illustrated in FIG. 5C and the profile illustrated in FIG. 6C are equivalent to an optimum reception delay pattern in the reception ultrasonic elements 114 in each of the states and the optimum reception delay pattern is used as the origin time adjustment pattern for adjusting the origin time of the ultrasonic waveform data for each of the ultrasonic elements 111 forming the reception ultrasonic elements 114 when processing the ultrasonic waveform data. Concretely, the present inventor conceived that origin time adjustment patterns corresponding to the optimum reception delay patterns responsive to the respective deviation angles are prepared, according to each of the origin time adjustment patterns, the processing to synthesize pieces of the ultrasonic waveform data each having the adjusted origin time is performed to generate the synthesized ultrasonic waveform data, and the presence or absence of the defect 211 is evaluated based on the generated synthesized ultrasonic waveform data, to thereby suppress the decrease in accuracy of detecting the defect 211. Therefore, this embodiment employs a mode in which the profile illustrated in FIG. 5C is applied as an "origin time adjustment pattern 510 for the deviation angle=0°" and the profile illustrated in FIG. 6C is applied as an "origin time adjustment pattern 610 for the deviation angle=−8°."

Figure 7:
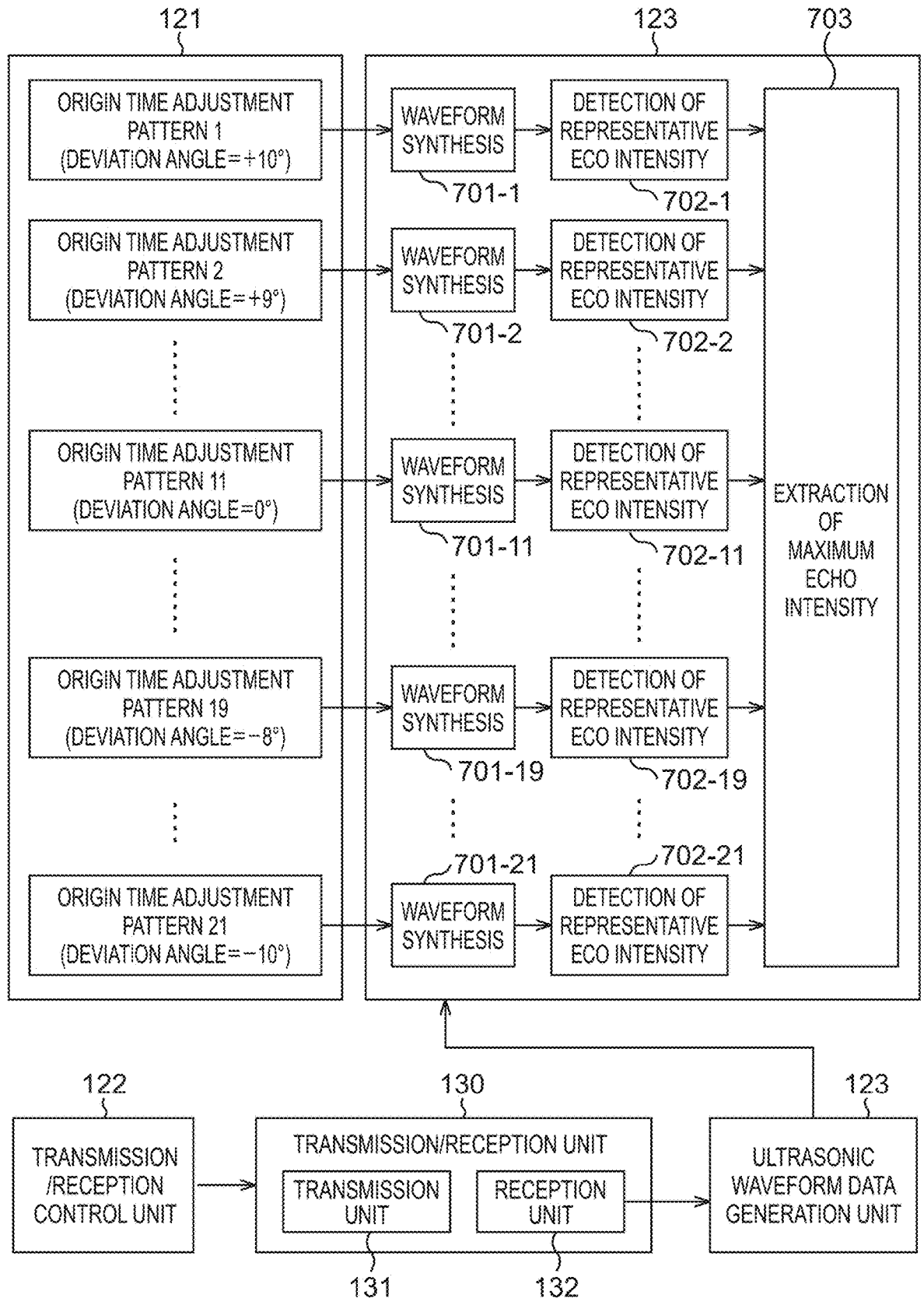
FIG. 7 is a view illustrating the embodiment of the present invention and illustrating one example of a flow of processing in an origin time adjustment pattern information acquisition unit, a transmission/reception control unit, a transmission/reception unit, an ultrasonic waveform data generation unit, and an ultrasonic waveform data processing unit that are illustrated in FIG. 1.

FIG. 7 is a view illustrating the embodiment of the present invention and illustrating one example of a flow of processing in the origin time adjustment pattern information acquisition unit 121, the transmission/reception control unit 122, the transmission/reception unit 130, the ultrasonic waveform data generation unit 123, and the ultrasonic waveform data processing unit 124 that are illustrated in FIG. 1. In FIG. 7, the same reference numerals are added to the same components as those illustrated in FIG. 1.

FIG. 7 illustrates an example where the origin time adjustment pattern information acquisition unit 121 has acquired the origin time adjustment pattern information 141 including 21 pieces of origin time adjustment patterns of an origin time adjustment pattern 1 to an origin time adjustment pattern 21 from the storage unit 140.

Concretely, the origin time adjustment pattern 11 illustrated in FIG. 7 is equivalent to the "origin time adjustment pattern 510 for the deviation angle=0°" illustrated in FIG. 5C that is obtained by performing the processing explained in FIG. 5A to FIG. 5C in the case of the deviation angle illustrated in FIG. 4 being 0°. Further, the origin time adjustment pattern 19 illustrated in FIG. 7 is equivalent to the "origin time adjustment pattern 610 for the deviation angle=−8°" illustrated in FIG. 6C that is obtained by performing the processing explained in FIG. 6A to FIG. 6C in the case of the deviation angle illustrated in FIG. 4 being −8°. Further, the origin time adjustment pattern 1 illustrated in FIG. 7 is an "origin time adjustment pattern for the deviation angle=+10°" obtained by performing the same processing as that explained in FIG. 5A to FIG. 5C or FIG. 6A to FIG. 6C in the case of the deviation angle illustrated in FIG. 4 being +10° ($\alpha$=10). Further, the origin time adjustment pattern 2 illustrated in FIG. 7 is an "origin time adjustment pattern for the deviation angle=+9°" obtained by performing the same processing as that explained in FIG. 5A to FIG. 5C or FIG. 6A to FIG. 6C in the case of the deviation angle illustrated in FIG. 4 being +9° ($\alpha$=9). Further, the origin time adjustment pattern 21 illustrated in FIG. 7 is an "origin time adjustment pattern for the deviation angle=−10°" obtained by performing the same processing as that explained in FIG. 5A to FIG. 5C or FIG. 6A to FIG. 6C in the case of the deviation angle illustrated in FIG. 4 being −10° ($\beta$=10). That is, the plural origin time adjustment pattern 1 to origin time adjustment pattern 21 illustrated in FIG. 7 are that the deviation angle illustrated in FIG. 4 is set every 1° within a range of +10° to −10°.

In this case, first, the transmission/reception control unit 122, based on input information input from the input unit 150, for example, performs setting of the transmission ultrasonic elements 112 and setting of the reception ultrasonic elements 114, and then controls the transmission/reception unit 130. The transmission/reception unit 130 transmits and receives the ultrasonic beams to and from the welded steel pipe 200 based on the control of the transmission/reception control unit 122. Concretely, the transmission unit 131 performs processing to transmit the ultrasonic beams 113 from the transmission ultrasonic elements 112 set in the transmission/reception control unit 122. Incidentally, when making the transmission ultrasonic elements 112 transmit the ultrasonic beams 113, the focusing position 113b of the ultrasonic beams 113 is set to be located at the welded portion 210 in the case of the deviation angle being 0°. Further, the reception unit 132 performs processing to receive the reflected ultrasonic beams by each of the ultrasonic elements 111 forming the reception ultrasonic elements 114 set in the transmission/reception control unit 122.

Then, the ultrasonic waveform data generation unit 123 generates the ultrasonic waveform data representing amplitudes of the reflected ultrasonic beams received in the reception unit 132 in time series for each of the ultrasonic elements 111 forming the reception ultrasonic elements 114.

Then, the ultrasonic waveform data processing unit 124 uses a plurality of the origin time adjustment patterns acquired in the origin time adjustment pattern information acquisition unit 121, adjusts the origin time of each of the ultrasonic waveform data generated for each of the ultrasonic elements 111 forming the reception ultrasonic elements 114 in the ultrasonic waveform data generation unit 123 according to each of the origin time adjustment patterns, and synthesizes pieces of the ultrasonic waveform data each having the adjusted origin time to generate the synthesized ultrasonic waveform data. In FIG. 7, the processing to generate the synthesized ultrasonic waveform data is described as "waveform synthesis 701." Concretely, in FIG. 7, the processing to generate the synthesized ultrasonic waveform data according to the origin time adjustment pattern 1 is described as waveform synthesis 701-1, the processing to generate the synthesized ultrasonic waveform data according to the origin time adjustment pattern 2 is described as waveform synthesis 701-2, the processing to generate the synthesized ultrasonic waveform data according to the origin time adjustment pattern 11 is described as waveform synthesis 701-11, the processing to generate the synthesized ultrasonic waveform data according to the origin time adjustment pattern 19 is described as waveform synthesis 701-19, and the processing to generate the synthesized ultrasonic waveform data according to the origin time adjustment pattern 21 is described as waveform synthesis 701-21.

Then, the ultrasonic waveform data processing unit 124 detects a representative echo intensity with the maximum amplitude in a predetermined time period of the synthesized ultrasonic waveform data according to each of the origin time adjustment patterns. In FIG. 7, the processing to detect the representative echo intensity is described as "detection of representative echo intensity 702." Concretely, in FIG. 7, the processing to detect the representative echo intensity according to the origin time adjustment pattern 1 is described as detection of representative echo intensity 702-1, the processing to detect the representative echo intensity according to the origin time adjustment pattern 2 is described as detection of representative echo intensity 702-2, the processing to detect the representative echo intensity according to the origin time adjustment pattern 11 is described as detection of representative echo intensity 702-11, the processing to detect the representative echo intensity according to the origin time adjustment pattern 19 is described as detection of representative echo intensity 702-19, and the processing to detect the representative echo intensity according to the origin time adjustment pattern 21 is described as detection of representative echo intensity 702-21.

Then, the ultrasonic waveform data processing unit 124 extracts the maximum echo intensity being the maximum representative echo intensity from the representative echo intensities detected according to each of the origin time adjustment patterns. In FIG. 7, the processing to extract the maximum echo intensity is described as "extraction of maximum echo intensity 703."

The processing of the ultrasonic waveform data processing unit 124 for the origin time adjustment pattern 11 illustrated in FIG. 7 and the processing of the ultrasonic waveform data processing unit 124 for the origin time adjustment pattern 19 illustrated in FIG. 7 will be explained below representatively.

Figure 8A:
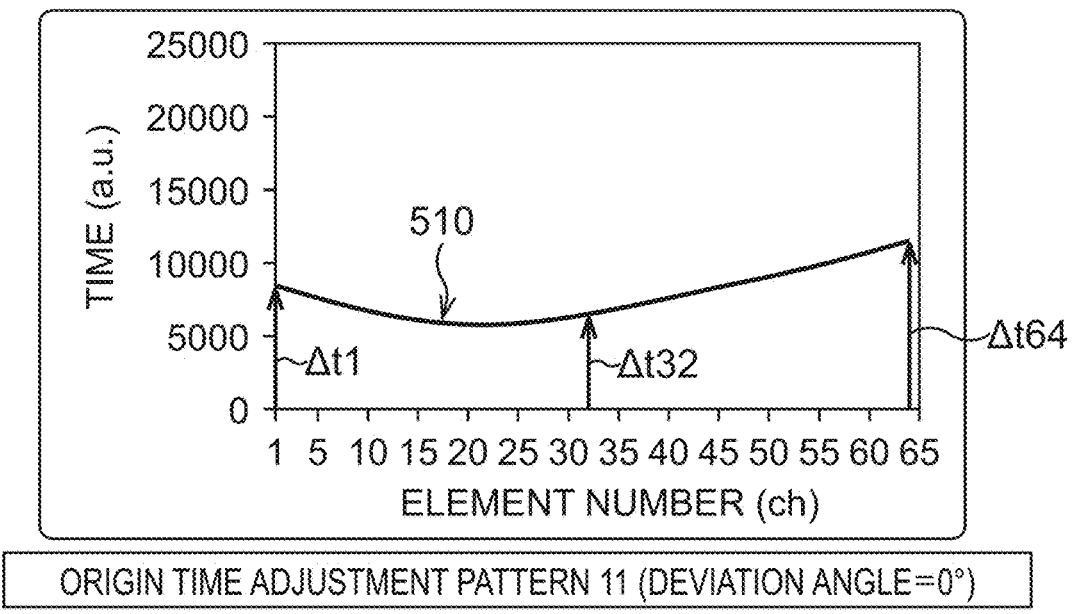
FIG. 8A is a view illustrating the embodiment of the present invention and illustrating one example of processing in the ultrasonic waveform data processing unit for an origin time adjustment pattern 11 illustrated in FIG. 7.
Figure 8B:
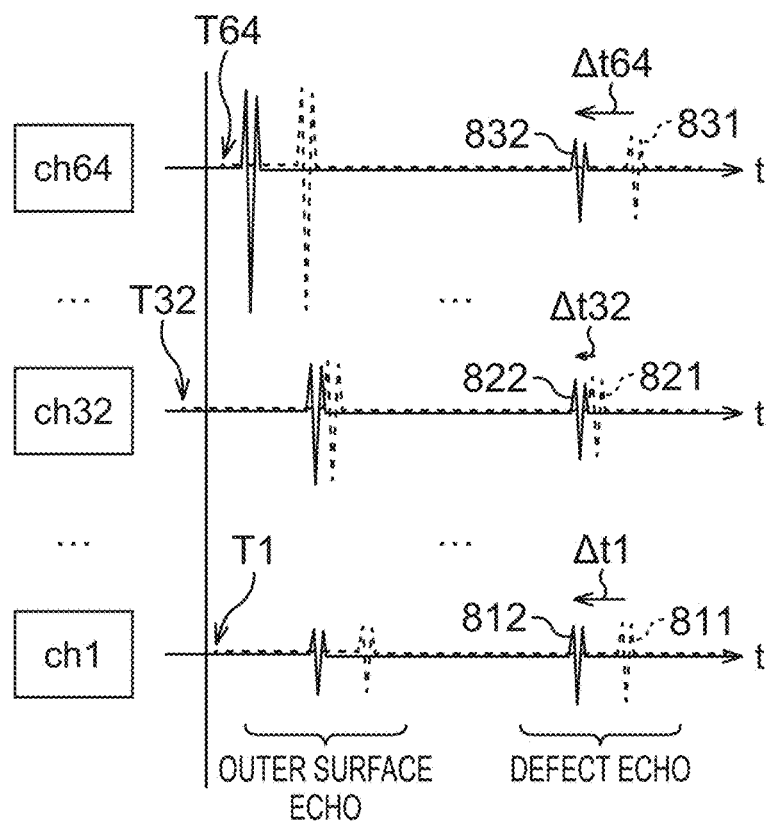
FIG. 8B is a view illustrating the embodiment of the present invention and illustrating one example of the processing in the ultrasonic waveform data processing unit for the origin time adjustment pattern 11 illustrated in FIG. 7.
Figure 8C:
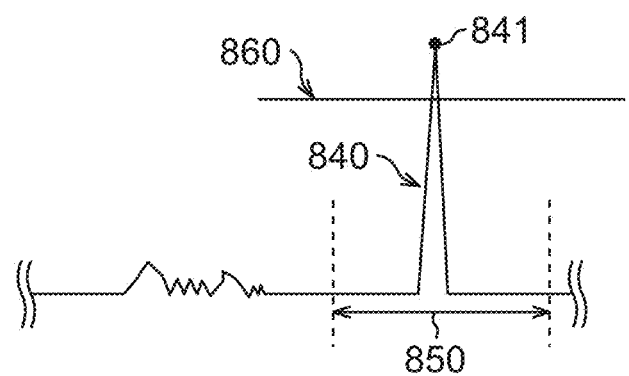
FIG. 8C is a view illustrating the embodiment of the present invention and illustrating one example of the processing in the ultrasonic waveform data processing unit for the origin time adjustment pattern 11 illustrated in FIG. 7.

FIG. 8A to FIG. 8C are views illustrating the embodiment of the present invention and illustrating one example of the processing of the ultrasonic waveform data processing unit 124 for the origin time adjustment pattern 11 illustrated in FIG. 7.

FIG. 8A illustrates the "origin time adjustment pattern 510 for the deviation angle=0°" illustrated in FIG. 5C, which is the origin time adjustment pattern 11 illustrated in FIG. 7. Here, in the following explanation, out of a plurality of the ultrasonic elements 111 forming the reception ultrasonic elements 114, the ultrasonic element 111 of ch 1, the ultrasonic element 111 of ch 32, and the ultrasonic element 111 of ch 64 will be explained representatively.

The ultrasonic waveform data processing unit 124 first calculates an elapsed time $\Delta t$ from the reference time point (time 0) for each of the ultrasonic elements 111 forming the reception ultrasonic elements 114 in terms of the origin time adjustment pattern 510 for the deviation angle=0°. For example, the ultrasonic waveform data processing unit 124 calculates an elapsed time $\Delta t1$ in terms of the ultrasonic element 111 of ch 1, calculates an elapsed time $\Delta t32$ in terms of the ultrasonic element 111 of ch 32, and calculates an elapsed time Δt64 in terms of the ultrasonic element 111 of ch 64.

FIG. 8B illustrates the ultrasonic waveform data of the ultrasonic element 111 of ch 1, the ultrasonic waveform data of the ultrasonic element 111 of ch 32, and the ultrasonic waveform data of the ultrasonic element 111 of ch 64. In FIG. 8B, the horizontal axis indicates an elapsed time and the vertical axis indicates an amplitude of the received reflected ultrasonic beam. Further, FIG. 8B illustrates the portions corresponding to the outer surface echo and the defect echo illustrated in FIG. 5A respectively. Further, in FIG. 8B, an origin time T1 of ultrasonic waveform data 811, an origin time T32 of ultrasonic waveform data 821, and an origin time T64 of ultrasonic waveform data 831 are set.

Concretely, in FIG. 8B, in terms of the ultrasonic element 111 of ch 1, the ultrasonic waveform data 811 generated in the ultrasonic waveform data generation unit 123 and ultrasonic waveform data 812 made by shifting the ultrasonic waveform data 811 forward by the elapsed time Δt1 illustrated in FIG. 8A for the waveform synthesis to adjust the origin time T1 are illustrated. Similarly, in FIG. 8B, in terms of the ultrasonic element 111 of ch 32, the ultrasonic waveform data 821 generated in the ultrasonic waveform data generation unit 123 and ultrasonic waveform data 822 made by shifting the ultrasonic waveform data 821 forward by the elapsed time Δt32 illustrated in FIG. 8A for the waveform synthesis to adjust the origin time T32 are illustrated. Similarly, in FIG. 8B, in terms of the ultrasonic element 111 of ch 64, the ultrasonic waveform data 831 generated in the ultrasonic waveform data generation unit 123 and ultrasonic waveform data 832 made by shifting the ultrasonic waveform data 831 forward by the elapsed time Δt64 illustrated in FIG. 8A for the waveform synthesis to adjust the origin time T64 are illustrated. Further, the ultrasonic waveform data processing unit 124 performs the same processing for the other ultrasonic elements 111 of ch.

FIG. 8C illustrates synthesized ultrasonic waveform data 840 generated by the ultrasonic waveform data processing unit 124 synthesizing the ultrasonic waveform data 812, the ultrasonic waveform data 822, and the ultrasonic waveform data 832 that are illustrated in FIG. 8B and further pieces of ultrasonic waveform data of the other ultrasonic elements 111 of ch. The processing to generate the synthesized ultrasonic waveform data 840 is processing equivalent to the "waveform synthesis 701-11" in FIG. 7.

Then, the ultrasonic waveform data processing unit 124 detects a representative echo intensity 841 with the maximum amplitude in a predetermined time period (the time period described as the defect echo in FIG. 8B, for example) 850 of the synthesized ultrasonic waveform data 840 illustrated in FIG. 8C. The processing to detect the representative echo intensity 841 is processing equivalent to the "detection of representative echo intensity 702-11" in FIG. 7.

Figure 9A:
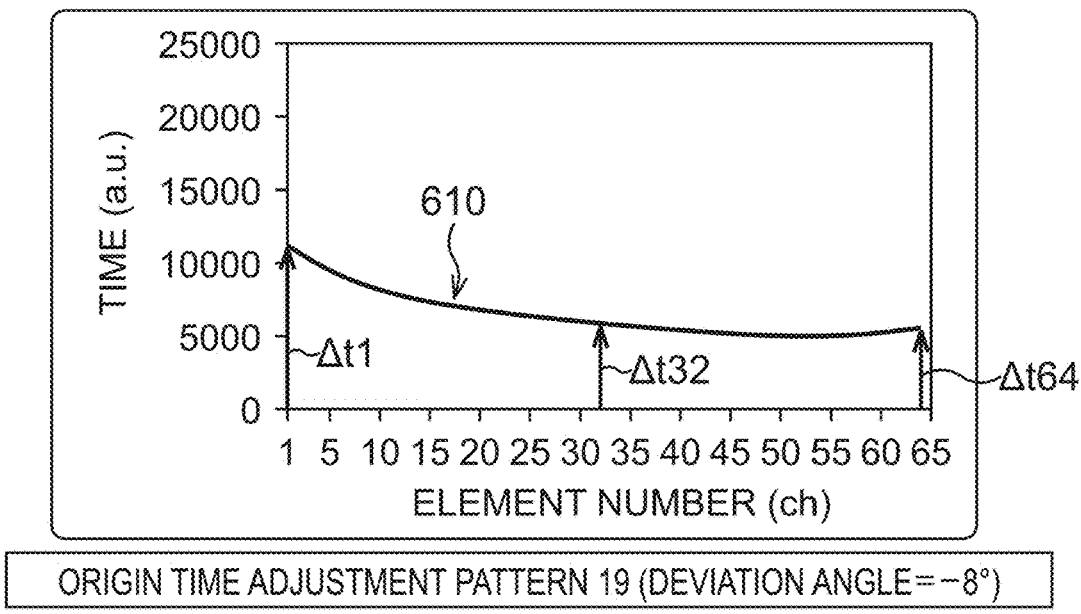
FIG. 9A is a view illustrating the embodiment of the present invention and illustrating one example of processing in the ultrasonic waveform data processing unit for an origin time adjustment pattern 19 illustrated in FIG. 7.
Figure 9B:
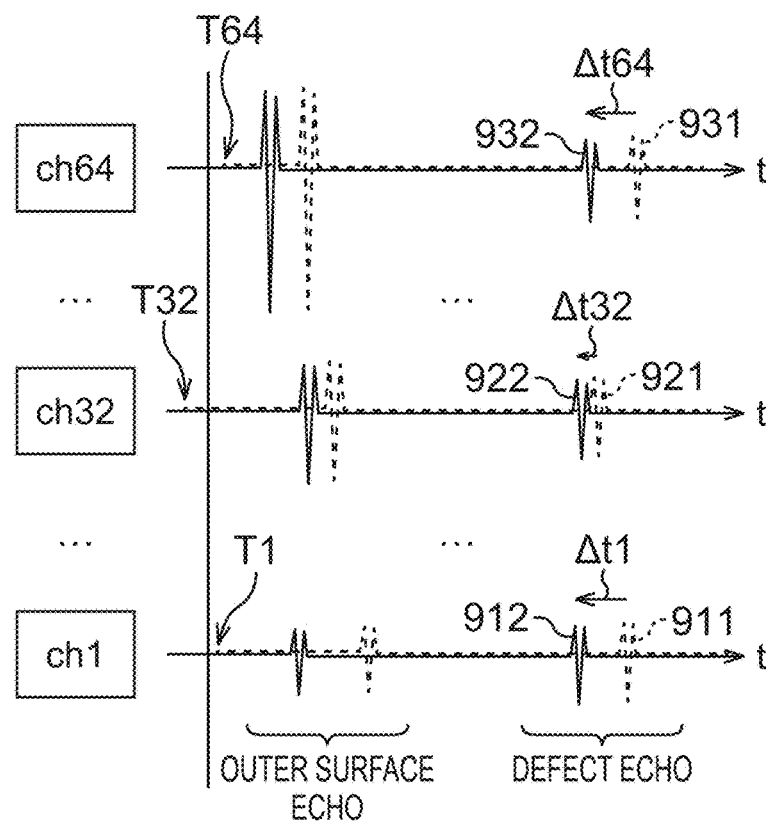
FIG. 9B is a view illustrating the embodiment of the present invention and illustrating one example of the processing in the ultrasonic waveform data processing unit for the origin time adjustment pattern 19 illustrated in FIG. 7.
Figure 9C:
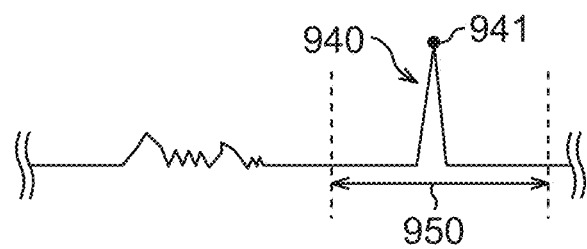
FIG. 9C is a view illustrating the embodiment of the present invention and illustrating one example of the processing in the ultrasonic waveform data processing unit for the origin time adjustment pattern 19 illustrated in FIG. 7.

FIG. 9A to FIG. 9C are views illustrating the embodiment of the present invention and illustrating one example of the processing of the ultrasonic waveform data processing unit 124 for the origin time adjustment pattern 19 illustrated in FIG. 7.

FIG. 9A illustrates the "origin time adjustment pattern 610 for the deviation angle=−8°" illustrated in FIG. 6C, which is the origin time adjustment pattern 19 illustrated in FIG. 7. Here, in the following explanation, out of a plurality of the ultrasonic elements 111 forming the reception ultrasonic elements 114, the ultrasonic element 111 of ch 1, the ultrasonic element 111 of ch 32, and the ultrasonic element 111 of ch 64 will be explained representatively.

The ultrasonic waveform data processing unit 124 first calculates an elapsed time Δt from the reference time point (time 0) for each of the ultrasonic elements 111 forming the reception ultrasonic elements 114 in terms of the origin time adjustment pattern 610 for the deviation angle=−8°. For example, the ultrasonic waveform data processing unit 124 calculates an elapsed time Δt1 in terms of the ultrasonic element 111 of ch 1, calculates an elapsed time Δt32 in terms of the ultrasonic element 111 of ch 32, and calculates an elapsed time Δt64 in terms of the ultrasonic element 111 of ch 64.

FIG. 9B illustrates the ultrasonic waveform data of the ultrasonic element 111 of ch 1, the ultrasonic waveform data of the ultrasonic element 111 of ch 32, and the ultrasonic waveform data of the ultrasonic element 111 of ch 64. In FIG. 9B, the horizontal axis indicates an elapsed time and the vertical axis indicates an amplitude of the received reflected ultrasonic beam. Further, FIG. 9B illustrates the portions corresponding to the outer surface echo and the defect echo illustrated in FIG. 6A respectively. Further, in FIG. 9B, an origin time T1 of ultrasonic waveform data 911, an origin time T32 of ultrasonic waveform data 921, and an origin time T64 of ultrasonic waveform data 931 are set.

Concretely, in FIG. 9B, in terms of the ultrasonic element 111 of ch 1, the ultrasonic waveform data 911 generated in the ultrasonic waveform data generation unit 123 and ultrasonic waveform data 912 made by shifting the ultrasonic waveform data 911 forward by the elapsed time Δt1 illustrated in FIG. 9A for the waveform synthesis to adjust the origin time T1 are illustrated. Similarly, in FIG. 9B, in terms of the ultrasonic element 111 of ch 32, the ultrasonic waveform data 921 generated in the ultrasonic waveform data generation unit 123 and ultrasonic waveform data 922 made by shifting the ultrasonic waveform data 921 forward by the elapsed time Δt32 illustrated in FIG. 9A for the waveform synthesis to adjust the origin time T32 are illustrated. Similarly, in FIG. 9B, in terms of the ultrasonic element 111 of ch 64, the ultrasonic waveform data 931 generated in the ultrasonic waveform data generation unit 123 and ultrasonic waveform data 932 made by shifting the ultrasonic waveform data 931 forward by the elapsed time Δt64 illustrated in FIG. 9A for the waveform synthesis to adjust the origin time T64 are illustrated. Further, the ultrasonic waveform data processing unit 124 performs the same processing for the other ultrasonic elements 111 of ch.

FIG. 9C illustrates synthesized ultrasonic waveform data 940 generated by the ultrasonic waveform data processing unit 124 synthesizing the ultrasonic waveform data 912, the ultrasonic waveform data 922, and the ultrasonic waveform data 932 that are illustrated in FIG. 9B and further pieces of ultrasonic waveform data of the other ultrasonic elements 111 of ch. The processing to generate the synthesized ultrasonic waveform data 940 is processing equivalent to the "waveform synthesis 701-19" in FIG. 7.

Then, the ultrasonic waveform data processing unit 124 detects a representative echo intensity 941 with the maximum amplitude in a predetermined time period (the time period described as the defect echo in FIG. 9B, for example) 950 of the synthesized ultrasonic waveform data 940 illustrated in FIG. 9C. The processing to detect the representative echo intensity 941 is processing equivalent to the "detection of representative echo intensity 702-19" in FIG. 7.

In the above explanation, regarding the origin time adjustment pattern 11 illustrated in FIG. 7, up to the processing to detect the representative echo intensity 841 has been explained while using FIG. 8A to FIG. 8C and regarding the origin time adjustment pattern 19 illustrated in FIG. 7, up to the processing to detect the representative echo intensity 941 has been explained while using FIG. 9A to FIG. 9C, and further regarding the other origin time adjustment patterns illustrated in FIG. 7 as well, up to the processing to detect a representative echo intensity is performed by performing the same processing. Thereby, pieces of the processing to detect the representative echo intensity in terms of 21 pieces in total of the origin time adjustment pattern 1 to the origin time adjustment pattern 21 are performed.

Then, the ultrasonic waveform data processing unit 124 extracts the maximum echo intensity being the maximum representative echo intensity from 21 pieces of the representative echo intensities detected according to each of the origin time adjustment patterns. Here, it is set that the representative echo intensity 841 in the origin time adjustment pattern 11 illustrated in FIG. 8C is extracted as the maximum echo intensity.

Thereafter, the defect evaluation unit 125 uses the maximum echo intensity (841 illustrated in FIG. 8C in this embodiment) extracted by the ultrasonic waveform data processing unit 124 to evaluate whether or not the defect 211 is present in the welded portion 210. Concretely, the defect evaluation unit 125 evaluates that the defect 211 is present in the welded portion 210 in the case where the maximum echo intensity 841 illustrated in FIG. 8C is equal to or more than a predetermined threshold value relating to defect evaluation. For example, in the case where a predetermined threshold value 860 illustrated in FIG. 8C is set as the threshold value relating to the defect evaluation, the maximum echo intensity 841 is equal to or more than the predetermined threshold value 860, and thus, in this case, the defect evaluation unit 125 evaluates that the defect 211 is present in the welded portion 210.

Figure 10:
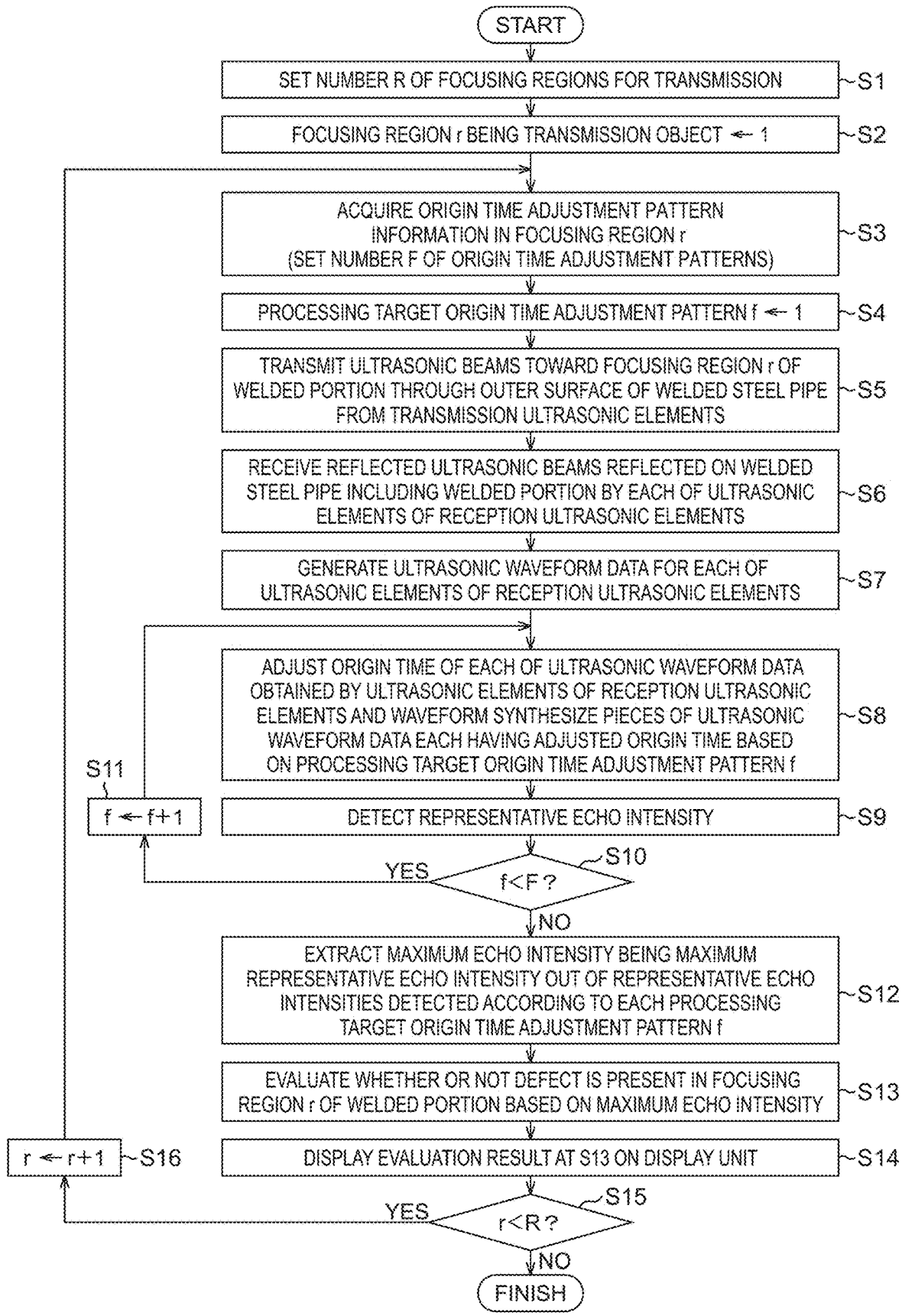
FIG. 10 is a flowchart illustrating one example of processing procedures of a defect detection method by the defect detection device according to the embodiment of the present invention.

FIG. 10 is a flowchart illustrating one example of processing procedures of a defect detection method by the defect detection device 100 according to the embodiment of the present invention.

First, at Step S1 in FIG. 10, the transmission/reception control unit 122 sets a focusing region number R indicating the number of focusing regions where the ultrasonic beams 113 are focused in the thickness direction of the welded steel pipe 200 based on input information input from the input unit 150, for example.

Figure 11A:
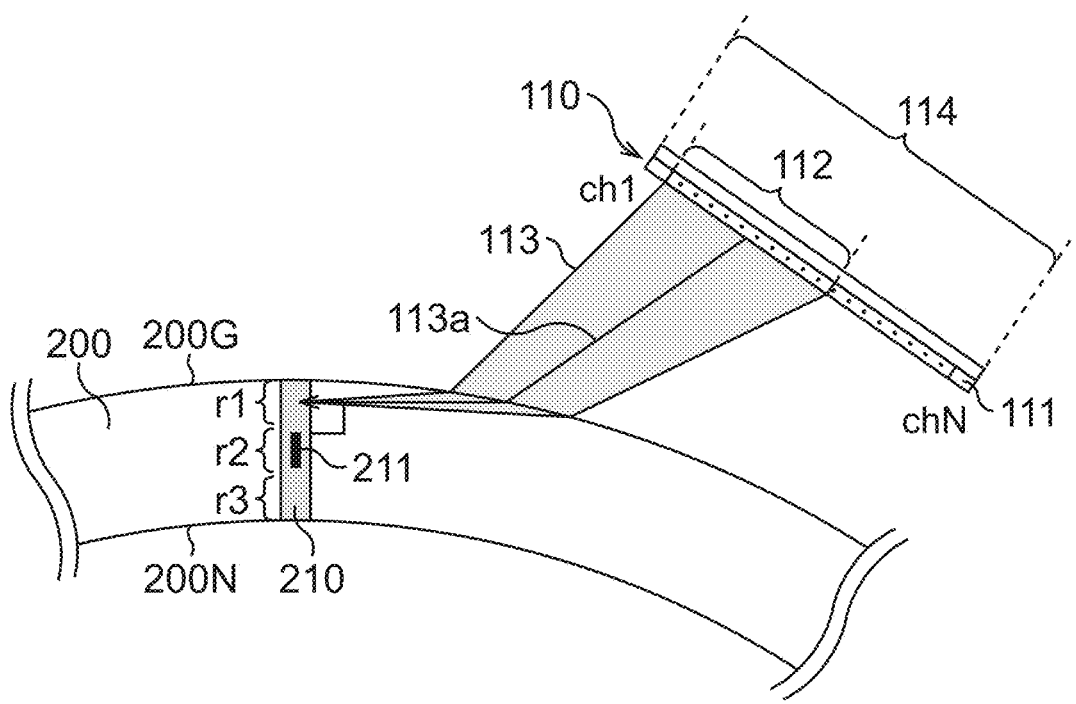
FIG. 11A is a view illustrating a first example of the case where the defect detection device according to the embodiment of the present invention performs defect detection processing by focusing ultrasonic beams on a predetermined focusing region in a thickness direction of a welded steel pipe.
Figure 11B:
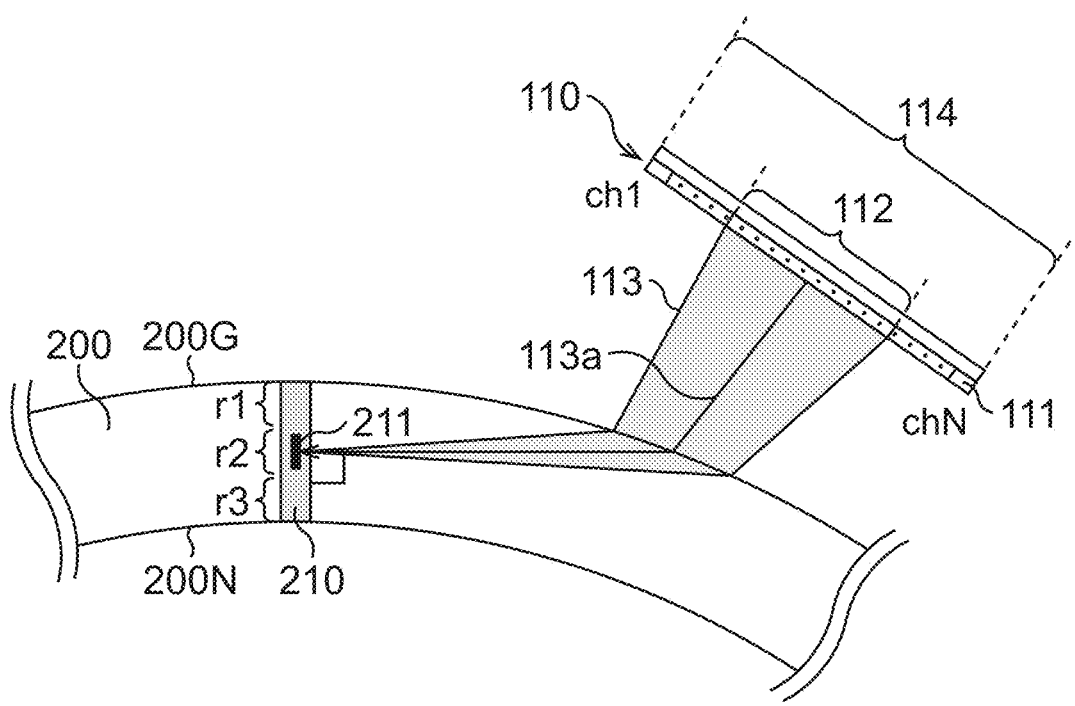
FIG. 11B is a view illustrating the first example of the case where the defect detection device according to the embodiment of the present invention performs the defect detection processing by focusing ultrasonic beams on a predetermined focusing region in the thickness direction of the welded steel pipe.
Figure 11C:
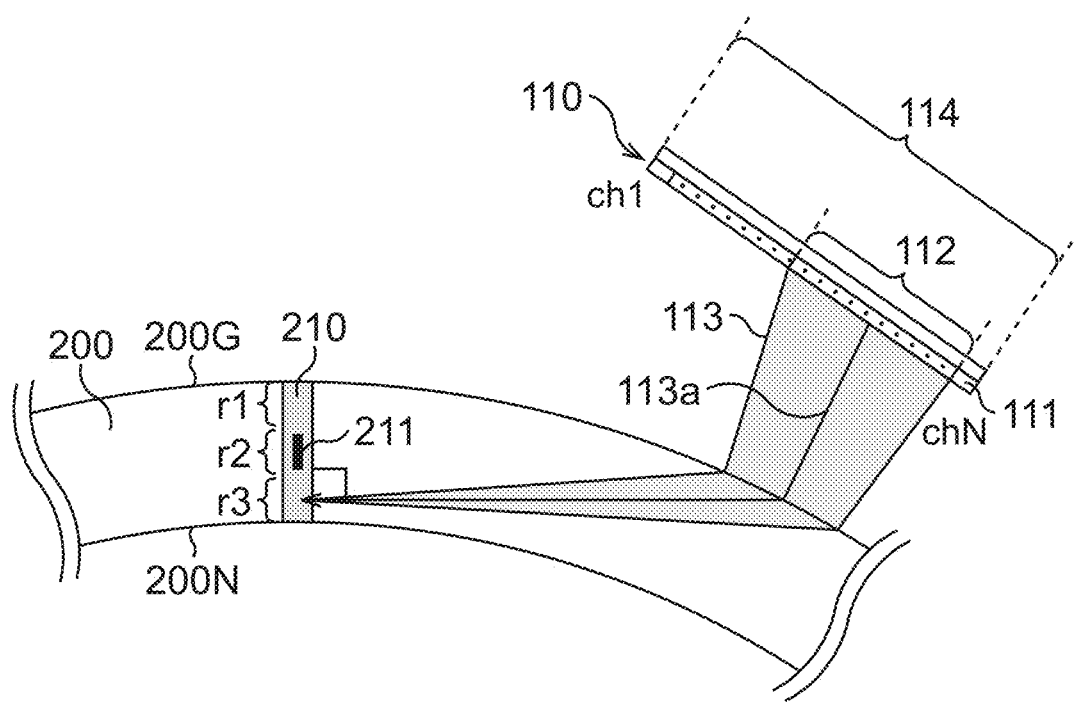
FIG. 11C is a view illustrating the first example of the case where the defect detection device according to the embodiment of the present invention performs the defect detection processing by focusing ultrasonic beams on a predetermined focusing region in the thickness direction of the welded steel pipe.

FIG. 11A to FIG. 11C each are a view illustrating a first example of the case where the defect detection device 100 according to the embodiment of the present invention performs defect detection processing by focusing the ultrasonic beams 113 on a predetermined focusing region in the thickness direction of the welded steel pipe 200.

FIG. 11A to FIG. 11C illustrate the case where the welded steel pipe 200 in the thickness direction is divided into three focusing regions r1 to r3 to scan the ultrasonic beams 113, and in this case, at Step S1 in FIG. 10 described above, the focusing region number R is set to three. Concretely, FIG. 11A illustrates the case where the transmission ultrasonic elements 112 formed of n pieces of the ultrasonic elements 111 on the side with small element numbers (ch 1 side) of the phased array probe 110 transmit the ultrasonic beams 113 in order to perform the defect detection processing of the focusing region r1 located near the outer surface 200G of the welded steel pipe 200 out of the three focusing regions r1 to r3. Further, FIG. 11B illustrates the case where the transmission ultrasonic elements 112 formed of n pieces of the ultrasonic elements 111 near the center of the phased array probe 110 transmit the ultrasonic beams 113 in order to perform the defect detection processing of the focusing region r2 located at the center portion of the welded steel pipe 200 in the thickness direction out of the three focusing regions r1 to r3. Further, FIG. 11C illustrates the case where the transmission ultrasonic elements 112 formed of n pieces of the ultrasonic elements 111 on the side with large element numbers (ch N side) of the phased array probe 110 transmit the ultrasonic beams 113 in order to perform the defect detection processing of the focusing region r3 located near the inner surface 200N of the welded steel pipe 200 out of the three focusing regions r1 to r3. That is, the first example illustrated in FIG. 11A to FIG. 11C illustrates the case of scanning the ultrasonic beams 113 in each of the focusing regions r1 to r3 in the thickness direction of the welded steel pipe 200 by sequentially changing the position of the transmission ultrasonic elements 112 in the phased array probe 110.

In the first example case illustrated in FIG. 11A to FIG. 11C, there is employed a mode in which the origin time adjustment pattern information 141 illustrated in FIG. 1 is stored in the storage unit 140 illustrated in FIG. 1 according to each of the focusing regions r1 to r3.

Figure 12A:
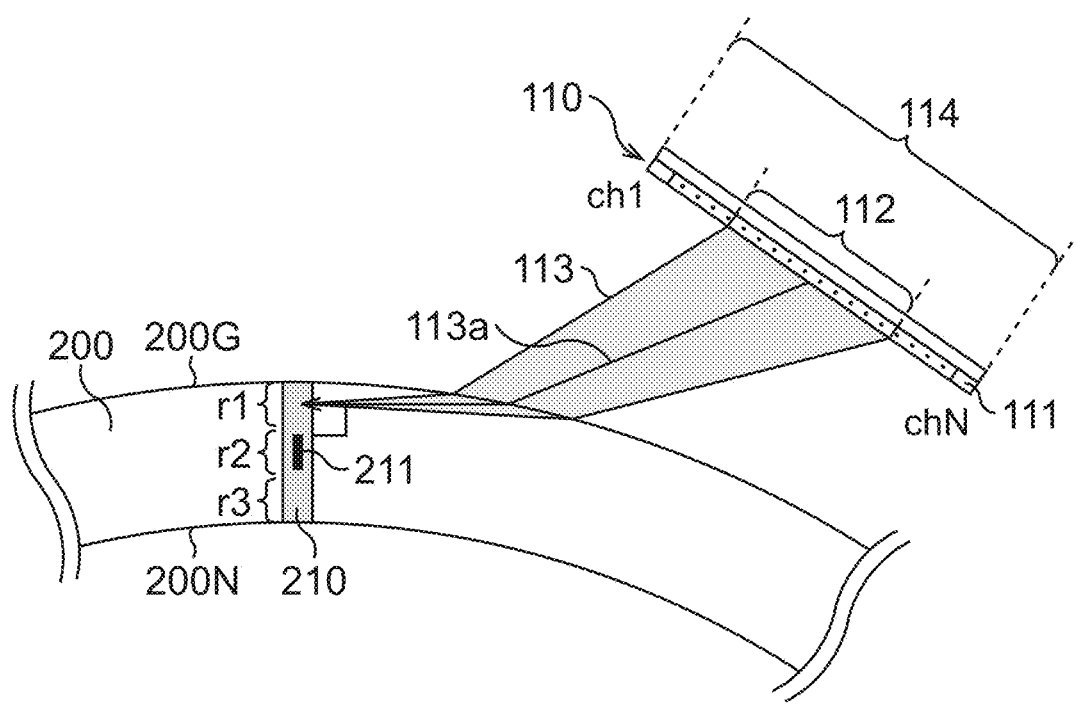
FIG. 12A is a view illustrating a second example of the case where the defect detection device according to the embodiment of the present invention performs the defect detection processing by focusing ultrasonic beams on a predetermined focusing region in the thickness direction of the welded steel pipe.
Figure 12B:
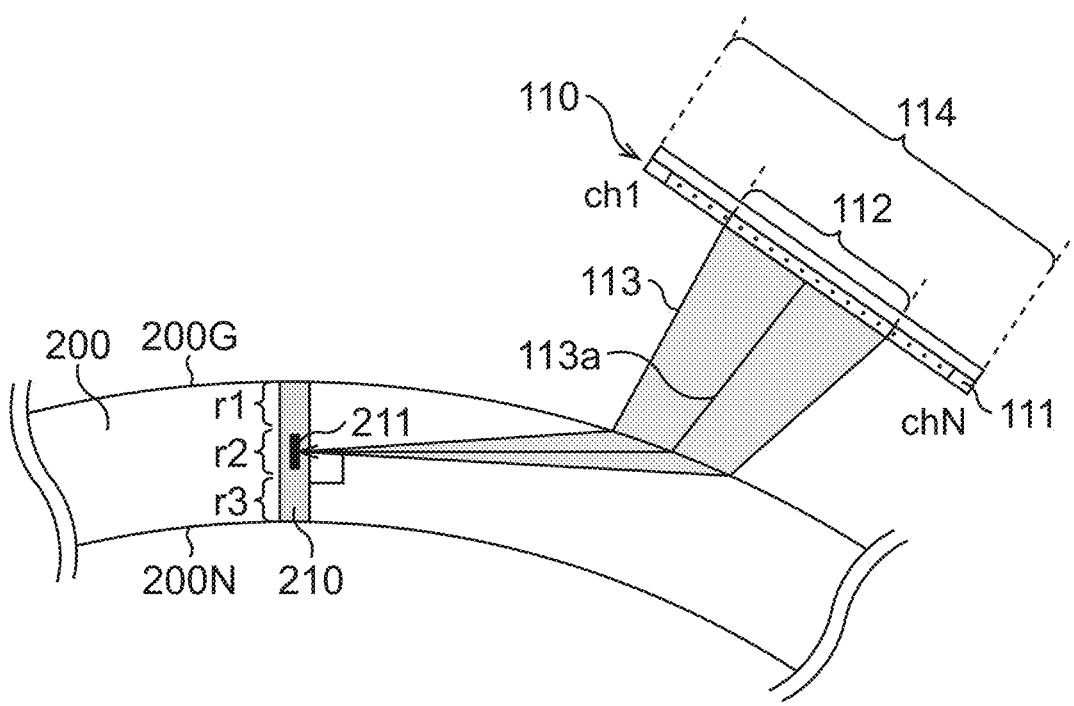
FIG. 12B is a view illustrating the second example of the case where the defect detection device according to the embodiment of the present invention performs the defect detection processing by focusing ultrasonic beams on a predetermined focusing region in the thickness direction of the welded steel pipe.
Figure 12C:
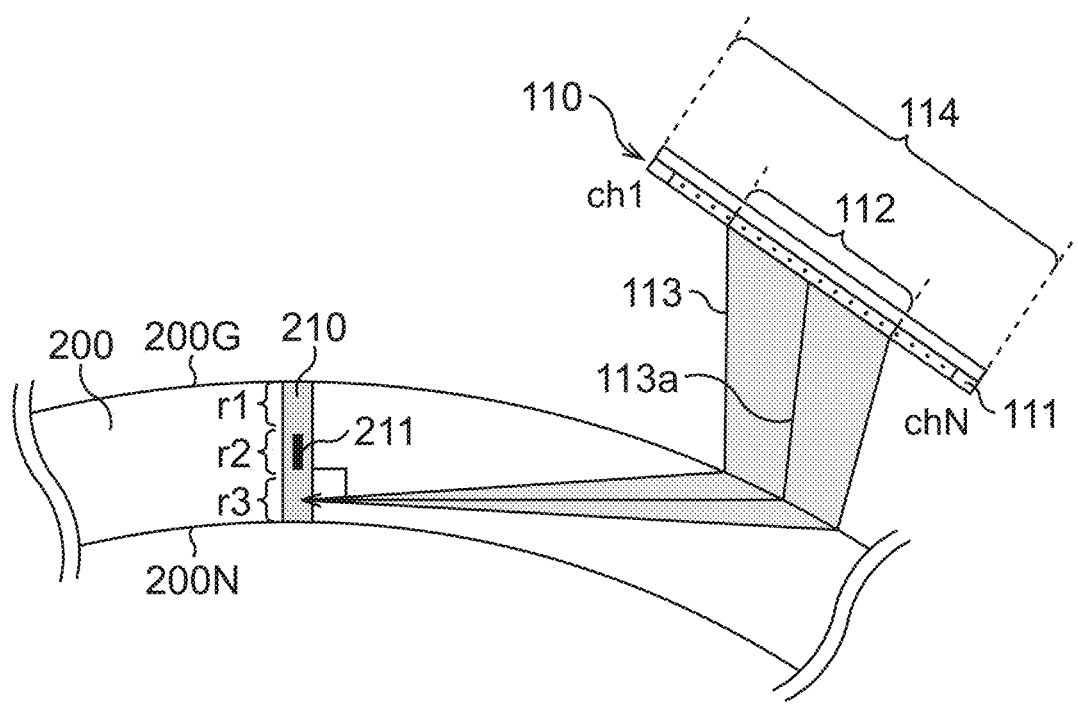
FIG. 12C is a view illustrating the second example of the case where the defect detection device according to the embodiment of the present invention performs the defect detection processing by focusing ultrasonic beams on a predetermined focusing region in the thickness direction of the welded steel pipe.

FIG. 12A to FIG. 12C each are a view illustrating a second example in the case where the defect detection device 100 according to the embodiment of the present invention performs the defect detection processing by focusing the ultrasonic beams 113 on a predetermined focusing region in the thickness direction of the welded steel pipe 200.

FIG. 12A to FIG. 12C also illustrate the case where the welded steel pipe 200 in the thickness direction is divided into the three focusing regions r1 to r3 similarly to the above-described case of FIG. 11A to FIG. 11C to scan the ultrasonic beams 113, and in this case, at Step S1 in FIG. 10 described above, the focusing region number R is set to three. Concretely, FIG. 12A illustrates the case where the transmission ultrasonic elements 112 formed of n pieces of the ultrasonic elements 111 near the center of the phased array probe 110 transmit the ultrasonic beams 113 while the transmission/reception control unit 122 adjusting the above-described transmission delay pattern in order to perform the defect detection processing of the focusing region r1 located near the outer surface 200G of the welded steel pipe 200 out of the three focusing regions r1 to r3. Further, FIG. 12B illustrates the case where the transmission ultrasonic elements 112 formed of n pieces of the ultrasonic elements 111 near the center of the phased array probe 110 transmit the ultrasonic beams 113 while the transmission/reception control unit 122 adjusting the above-described transmission delay pattern in order to perform the defect detection processing of the focusing region r2 located at the center portion of the welded steel pipe 200 in the thickness direction out of the three focusing regions r1 to r3. Further, FIG. 12C illustrates the case where the transmission ultrasonic elements 112 formed of n pieces of the ultrasonic elements 111 near the center of the phased array probe 110 transmit the ultrasonic beams 113 while the transmission/reception control unit 122 adjusting the above-described transmission delay pattern in order to perform the defect detection processing of the focusing region r3 located near the inner surface 200N of the welded steel pipe 200 out of the three focusing regions r1 to r3. That is, the second example illustrated in FIG. 12A to FIG. 12C illustrates the case where the position of the transmission ultrasonic elements 112 in the phased array probe 110 is fixed to the center portion and the transmission/reception control unit 122 sequentially changes the transmission delay pattern by the transmission ultrasonic elements 112, to thereby scan the ultrasonic beams 113 in each of the focusing regions r1 to r3 in the thickness direction of the welded steel pipe 200.

In the case of the second example illustrated in FIG. 12A to FIG. 12C, there is employed a mode in which the origin time adjustment pattern information 141 illustrated in FIG. 1 is stored in the storage unit 140 in FIG. 1 according to each of the focusing regions r1 to r3.

The explanation of FIG. 10 is started again here.

After the processing at Step S1 is finished, at Step S2, the transmission/reception control unit 122 sets one as a variable r representing the focusing region being a transmission object in the thickness direction of the welded steel pipe 200. Thereby, one is set as the focusing region r being a transmission object. For example, in the case of the first example illustrated in FIG. 11A to FIG. 11C, the focusing region r1 illustrated in FIG. 11A is set, and in the case of the second example illustrated in FIG. 12A to FIG. 12C, the focusing region r1 illustrated in FIG. 12A is set.

Then, at Step S3, the origin time adjustment pattern information acquisition unit 121 acquires the origin time adjustment pattern information 141 of the focusing region r set currently from the storage unit 140. Here, it is set that the origin time adjustment pattern 1 to the origin time adjustment pattern 21 illustrated in FIG. 7 are included in the origin time adjustment pattern information 141 acquired by the origin time adjustment pattern information acquisition unit 121. In this case, there is employed a mode in which the control and processing unit 120 sets 21 as a number F of the origin time adjustment patterns.

Then, at Step S4, the control and processing unit 120 substitutes one into a variable f representing a processing target origin time adjustment pattern. Thereby, the origin time adjustment pattern 1 illustrated in FIG. 7 is set as a processing target origin time adjustment pattern f.

Then, at Step S5, the transmission unit 131 performs processing to transmit the ultrasonic beams 113 toward the focusing region r of the welded portion 210 through the outer surface 200G of the welded steel pipe 200 from the transmission ultrasonic elements 112 based on control of the transmission/reception control unit 122. On this occasion, the focusing position 113b of the ultrasonic beams 113 is set to be located at the welded portion 210 in the case of the deviation angle being 0°.

Then, at Step S6, the reception unit 132 performs processing to receive the reflected ultrasonic beams reflected on the welded steel pipe 200 including the welded portion 210 by each of the ultrasonic elements 111 of the reception ultrasonic elements 114 based on control of the transmission/reception control unit 122.

Then, at Step S7, the ultrasonic waveform data generation unit 123 generates the ultrasonic waveform data representing the amplitudes of the reflected ultrasonic beams received in the reception unit 132 in time series for each of the ultrasonic elements 111 forming the reception ultrasonic elements 114.

Then, at Step S8, the ultrasonic waveform data processing unit 124 adjusts the origin time of each of the ultrasonic waveform data generated at Step S5 for each of the ultrasonic elements 111 forming the reception ultrasonic elements 114 and synthesizes pieces of the ultrasonic waveform data each having the adjusted origin time to generate the synthesized ultrasonic waveform data based on the processing target origin time adjustment pattern f. These pieces of the processing have been explained concretely while using FIG. 7 to FIG. 9C, and thus their detailed explanations are omitted.

Then, at Step S9, the ultrasonic waveform data processing unit 124 detects the representative echo intensity with the maximum amplitude in a predetermined time period of the synthesized ultrasonic waveform data generated at Step S7. This processing has been explained concretely while using FIG. 7 to FIG. 9C, and thus its detailed explanation is omitted.

Then, at Step S10, the control and processing unit 120 determines whether or not the variable f representing the processing target origin time adjustment pattern is smaller than the number F of the origin time adjustment patterns.

As a result of the determination at Step S10, in the case where the variable f representing the processing target origin time adjustment pattern is smaller than the number F of the origin time adjustment patterns (S10/YES), it is determined that there are the origin time adjustment patterns for which the processing is not yet performed, and then the processing proceeds to Step S11.

When proceeding to Step S11, the control and processing unit 120 adds one to the variable f representing the processing target origin time adjustment pattern. Thereby, a new origin time adjustment pattern is set as the processing target origin time adjustment pattern f. Then, when the processing at Step S11 is finished, the processing returns to Step S8 and pieces of processing at and after Step S8 are performed again.

On the other hand, as a result of the determination at Step S10, when the variable f representing the processing target origin time adjustment pattern is larger than the number F of the origin time adjustment patterns (namely, it is f≥F) (S10/NO), it is determined that the processing has been performed for all the origin time adjustment patterns acquired at Step S3, and then the processing proceeds to Step S12. Incidentally, the case where the processing proceeds to Step S12 means that the detections of 21 pieces in total of the representative echo intensities from the origin time adjustment pattern 1 to the origin time adjustment pattern 21 illustrated in FIG. 7 have been performed.

When proceeding to Step S12, the ultrasonic waveform data processing unit 124 extracts the maximum echo intensity being the maximum representative echo intensity from 21 pieces of the representative echo intensities detected according to each of the origin time adjustment patterns. Here, it is set that the representative echo intensity 841 in terms of the origin time adjustment pattern 11 illustrated in FIG. 8C has been extracted as the maximum echo intensity.

Then, at Step S13, the defect evaluation unit 125 uses the maximum echo intensity extracted at Step S12 (841 illustrated in FIG. 8C in this embodiment) and evaluates whether or not the defect 211 is present in the focusing region r of the welded portion 210. Concretely, the defect evaluation unit 125 evaluates that the defect 211 is present in the focusing region r of the welded portion 210 in the case where the maximum echo intensity 841 illustrated in FIG. 8C is equal to or more than a predetermined threshold value relating to the defect evaluation. For example, in the case where the predetermined threshold value 860 illustrated in FIG. 8C is set as the threshold value relating to the defect evaluation, the maximum echo intensity 841 is equal to or more than the predetermined threshold value 860, and thus, in this case, the defect evaluation unit 125 evaluates that the defect 211 is present in the focusing region r of the welded portion 210.

Then, at Step S14, the display control unit 126 performs a control to display a evaluation result regarding the presence or absence of the defect 211, which is obtained at Step S13, on the display unit 160.

Then, at Step S15, the transmission/reception control unit 122 determines whether or not the variable r representing the focusing region being a transmission object is less than the focusing region number R set at Step S1.

As a result of the determination at Step S15, in the case where the variable r representing the focusing region being a transmission object is less than the focusing region number R set at Step S1 (S15/YES), it is determined that the defect detection processing is not yet performed for all the focusing regions, and then the processing proceeds to Step S16.

When proceeding to Step S16, the transmission/reception control unit 122 adds one to the variable r representing the focusing region being a transmission object in the thickness direction of the welded steel pipe 200. Thereby, a new focusing region r being a transmission object is set. Thereafter, returning to Step S3, pieces of the processing at and after Step S3 are performed for the focusing region r newly set at Step S16.

On the other hand, as a result of the determination at Step S15, in the case where the variable r representing the focusing region being a transmission object is not less than the focusing region number R set at Step S1 (S16/NO), it is determined that the defect detection processing has been performed for all the focusing regions, and then the processing of the flowchart in FIG. 10 is finished. Incidentally, in the processing of the flowchart in FIG. 10, as described at Step S8 to Step S11, there is described a mode in which a plurality of the origin time adjustment patterns acquired at Step S1 are processed in series one by one, but the present invention is not limited to this mode, and for example, a mode in which a plurality of the origin time adjustment patterns acquired at Step S1 are processed in parallel simultaneously is also applicable to the present invention.

Figure 13:
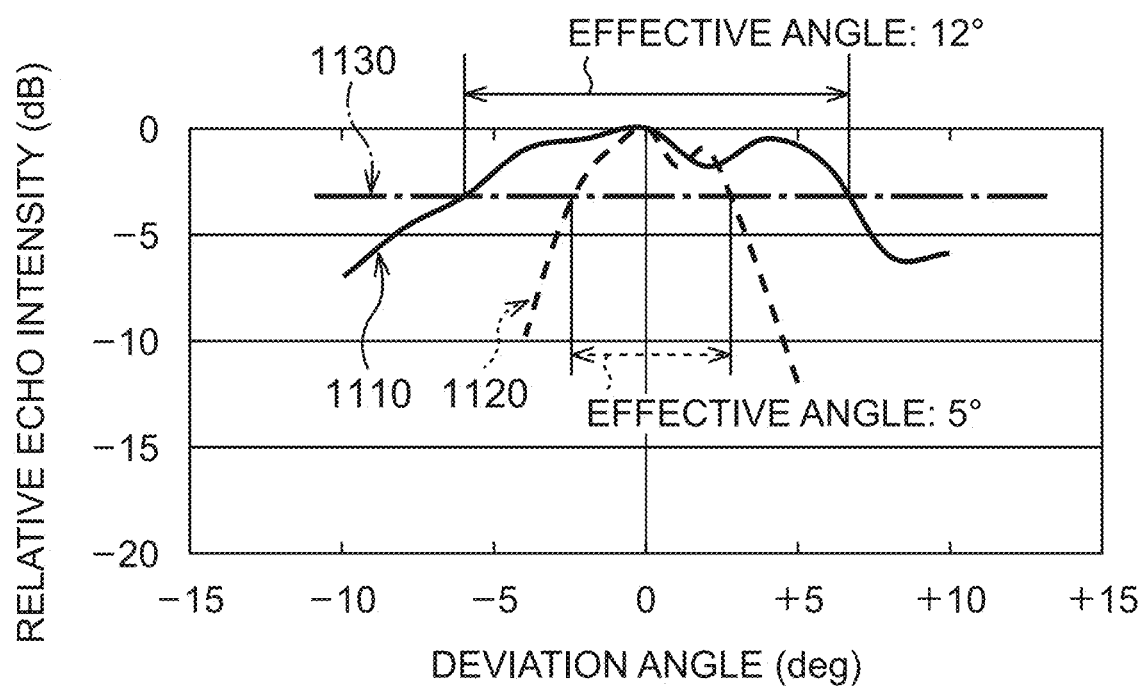
FIG. 13 is a view for explaining effects of the defect detection device according to the embodiment of the present invention.

FIG. 13 is a view for explaining the effects of the defect detection device 100 according to the embodiment of the present invention. Concretely, FIG. 13 illustrates a result obtained by using the calibration pipe 300 illustrated in FIG. 4 and measuring the defect echo intensities in the reflected ultrasonic beams from the artificial defect 311 (artificial defect reflected ultrasonic beams) received by the reception ultrasonic elements 114. In FIG. 13, the horizontal axis indicates a deviation angle from the first position 401 illustrated in FIG. 4 and the vertical axis indicates a relative echo intensity (dB) when the defect echo intensity in the case of the deviation angle being 0°, where the defect echo intensity is maximum, is set to 0.

In FIG. 13, a measurement result 1110 indicates the measurement result of the present invention, which is obtained by using a plurality of the origin time adjustment pattern 1 to the origin time adjustment pattern 21 and performing the processing of the flowchart illustrated in FIG. 10. Further, a measurement result 1120 indicates a measurement result of a comparative example, which is obtained by using only the single origin time adjustment pattern (for example, the origin time adjustment pattern 11 for the deviation angle=0°) in which the positional deviation of the welded portion 210 is not expected. Here, when a lower limit of stable detection 1130 is set to −3 dB, for example, an effective angle (allowable angle) is about 5° in the measurement result 1120 of the comparative example, while the effective angle (allowable angle) is about 12° in the measurement result 1110 of the present invention. As above, an increase in the effective angle (allowable angle) is enabled in the present invention as compared to the comparative example, which reveals that it is possible to suppress the decrease in accuracy of detecting the defect 211 in the case where the position of the welded portion 210 is deviated from an expected position.

(Other Embodiments)

In the above-described embodiment of the present invention, there has been explained the example in which 21 pieces of the origin time adjustment patterns from the origin time adjustment pattern 1 to the origin time adjustment pattern 21 that are illustrated in FIG. 7 are processed, but the present invention is not limited to this mode. The present invention also includes, for example, a mode in which 11 pieces of origin time adjustment patterns from an origin time adjustment pattern for the deviation angle=+5° (in this case, this origin time adjustment pattern is set to the origin time adjustment pattern 1 in consideration of the processing of the flowchart in FIG. 10) to an origin time adjustment pattern for the deviation angle=−5° (in this case, this origin time adjustment pattern is set to the origin time adjustment pattern 11 in consideration of the processing of the flowchart in FIG. 10) in consideration of the measurement result 1110 of the present invention illustrated in FIG. 13. Incidentally, in the case of this mode, it is possible to employ a mode in which for example, a user determines the origin time adjustment patterns relating to the range of deviation angles to be applied via the input portion 150.

Further, in the above-described embodiment of the present invention, there has been explained the example in which out of 64 pieces of the ultrasonic elements 111 composing the phased array probe 110, 24 pieces of the ultrasonic elements 111 (ch 21 to ch 44), being some of the ultrasonic elements 111, form the transmission ultrasonic elements 112, but the present invention is not limited to this mode. A mode in which out of 64 pieces of the ultrasonic elements 111 composing the phased array probe 110, all 64 pieces of the ultrasonic elements 111 (ch 1 to ch 64) form the transmission ultrasonic elements 112, for example, is also applicable to the present invention. Further, a mode in which out of 64 pieces of the ultrasonic elements 111 composing the phased array probe 110, some pieces of the ultrasonic elements other than 24 pieces of the ultrasonic elements form the transmission ultrasonic elements 112, for example, is also applicable to the present invention.

Further, in the above-described embodiment of the present invention, there has been explained the example in which out of 64 pieces of the ultrasonic elements 111 composing the phased array probe 110, all 64 pieces of the ultrasonic elements 111 (ch 1 to ch 64) form the reception ultrasonic elements 114, but the present invention is not limited to this mode. A mode in which out of 64 pieces of the ultrasonic elements 111 composing the phased array probe 110, some pieces of the ultrasonic elements form the reception ultrasonic elements 114, for example, is also applicable to the present invention.

Further, in the above-described embodiment of the present invention, there has been explained the example in which 64 pieces of the ultrasonic elements 111 compose the phased array probe 110, but the present invention is not limited to this mode. A mode in which a plurality of the ultrasonic elements other than 64 pieces of the ultrasonic elements 111 compose the phased array probe 110, for example, is also applicable to the present invention.

The present invention can be achieved also by processing in which a program implementing one or more functions of the above-described embodiment is supplied to a system or a device via a network or a storage medium and one or more processors in a computer of the system or the device read and execute the program. Further, the present invention can be achieved also by a circuit implementing one or more functions (for example, ASIC).

The program and a computer-readable storage medium in which the program is stored are included in the present invention.

It should be noted that the above-described embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

The invention claimed is:

1. A defect detection device that detects a defect present in a welded portion formed along a pipe longitudinal direction of a welded steel pipe, the defect detection device comprising:
a phased array probe that is installed outside an outer surface of the welded steel pipe and includes a plurality of ultrasonic elements arranged therein;
a transmission means that transmits ultrasonic beams toward the welded portion through the outer surface of the welded steel pipe from the ultrasonic elements;
a reception means that receives reflected ultrasonic beams being the ultrasonic beams reflected on the welded steel pipe including the welded portion by each of the ultrasonic elements;
an ultrasonic waveform data generation means that generates ultrasonic waveform data representing amplitudes of the reflected ultrasonic beams received by the reception means in time series for each of the ultrasonic elements;
an ultrasonic waveform data processing means that uses a plurality of origin time adjustment patterns, each being an origin time adjustment pattern for adjusting an origin time of the ultrasonic waveform data for each of the ultrasonic elements, in which a plurality of relative positional relationships between the phased array probe and the welded portion are set, and performs processing to synthesize pieces of the ultrasonic waveform data each having the adjusted origin time to generate synthesized ultrasonic waveform data according to each of the origin time adjustment patterns; and
a defect evaluation means that evaluates whether or not the defect is present in the welded portion based on the synthesized ultrasonic waveform data.

2. The defect detection device according to claim 1, wherein
the transmission means sets some or all of the ultrasonic elements out of a plurality of the ultrasonic elements composing the phased array probe as transmission ultrasonic elements and transmits the ultrasonic beams from the transmission ultrasonic elements,
the reception means sets some or all of the ultrasonic elements out of a plurality of the ultrasonic elements composing the phased array probe as reception ultrasonic elements and receives the reflected ultrasonic beams by each of the ultrasonic elements forming the reception ultrasonic elements,
the ultrasonic waveform data generation means generates the ultrasonic waveform data for each of the ultrasonic elements forming the reception ultrasonic elements,
the ultrasonic waveform data processing means uses a plurality of origin time adjustment patterns, each being an origin time adjustment pattern for adjusting an origin time of the ultrasonic waveform data for each of the ultrasonic elements forming the reception ultrasonic elements, in which a plurality of relative positional relationships between the phased array probe and the welded portion are set, and generates the synthesized ultrasonic waveform data according to each of the origin time adjustment patterns, and
the defect evaluation means evaluates whether or not the defect is present in the welded portion based on the synthesized ultrasonic waveform data generated by the ultrasonic waveform data processing means according to each of the origin time adjustment patterns.

3. The defect detection device according to claim 2, wherein
the transmission ultrasonic elements are formed of n pieces of the ultrasonic elements, being some of the ultrasonic elements, out of a plurality of the ultrasonic elements composing the phased array probe; and
the reception ultrasonic elements are formed of m pieces, being larger than n pieces, of the ultrasonic elements including n pieces of the ultrasonic elements, being some or all of the ultrasonic elements, out of a plurality of the ultrasonic elements composing the phased array probe.

4. The defect detection device according to claim 1, wherein
as for a plurality of the origin time adjustment patterns, a calibration pipe, being a steel pipe for calibrating the welded steel pipe, that has an artificial defect formed in a second welded portion equivalent to the welded portion is used, a plurality of angles in a circumferential direction of the calibration pipe are set with regard to the position of the second welded portion relative to the phased array probe as the relative positional relationships, according to each of the angles, artificial defect reflected ultrasonic beams, being the ultrasonic beams reflected on the artificial defect, are received by each of the ultrasonic elements to generate the ultrasonic waveform data for each of the ultrasonic elements, and a plurality of the origin time adjustment patterns are set based on appearance times of the artificial defect reflected ultrasonic beams in pieces of the generated ultrasonic waveform data.

5. The defect detection device according to claim 1, wherein
the ultrasonic waveform data processing means further detects a representative echo intensity with the maximum amplitude in a predetermined time period of the synthesized ultrasonic waveform data according to each of the origin time adjustment patterns, and
the defect evaluation means evaluates whether or not the defect is present in the welded portion by using the representative echo intensities detected by the ultrasonic waveform data processing means according to each of the origin time adjustment patterns.

6. The defect detection device according to claim 5, wherein
the ultrasonic waveform data processing means further extracts a maximum echo intensity being the maximum representative echo intensity from the representative echo intensities detected according to each of the origin time adjustment patterns, and
the defect evaluation means evaluates whether or not the defect is present in the welded portion by using the maximum echo intensity extracted by the ultrasonic waveform data processing means.

7. The defect detection device according to claim 6, wherein the defect evaluation means evaluates that the defect is present in the welded portion when the maximum echo intensity is equal to or more than a predetermined threshold value.

8. A defect detection method by a defect detection device that detects a defect present in a welded portion formed along a pipe longitudinal direction of the welded steel pipe, the defect detection device including: a phased array probe that is installed outside an outer surface of the welded steel pipe and includes a plurality of ultrasonic elements arranged therein; a transmission means that transmits ultrasonic beams toward the welded portion through the outer surface of the welded steel pipe from the ultrasonic elements; and a reception means that receives reflected ultrasonic beams being the ultrasonic beams reflected on the welded steel pipe including the welded portion by each of the ultrasonic elements, the defect detection method comprising:

an ultrasonic waveform data generation step that generates ultrasonic waveform data representing amplitudes of the reflected ultrasonic beams received by the reception means in time series for each of the ultrasonic elements;

an ultrasonic waveform data processing step that uses a plurality of origin time adjustment patterns, each being an origin time adjustment pattern for adjusting an origin time of the ultrasonic waveform data for each of the ultrasonic elements, in which a plurality of relative positional relationships between the phased array probe and the welded portion are set, and performs processing to synthesize pieces of the ultrasonic waveform data each having the adjusted origin time to generate synthesized ultrasonic waveform data according to each of the origin time adjustment patterns; and a defect evaluation step that evaluates whether or not the defect is present in the welded portion based on the synthesized ultrasonic waveform data.

9. A program for causing a computer to execute a defect detection method by a defect detection device that detects a defect present in a welded portion formed along a pipe longitudinal direction of the welded steel pipe, the defect detection device including: a phased array probe that is installed outside an outer surface of the welded steel pipe and includes a plurality of ultrasonic elements arranged therein; a transmission means that transmits ultrasonic beams toward the welded portion through the outer surface of the welded steel pipe from the ultrasonic elements; and a reception means that receives reflected ultrasonic beams being the ultrasonic beams reflected on the welded steel pipe including the welded portion by each of the ultrasonic elements, the program causing a computer to execute:

an ultrasonic waveform data generation step that generates ultrasonic waveform data representing amplitudes of the reflected ultrasonic beams received by the reception means in time series for each of the ultrasonic elements;

an ultrasonic waveform data processing step that uses a plurality of origin time adjustment patterns, each being an origin time adjustment pattern for adjusting an origin time of the ultrasonic waveform data for each of the ultrasonic elements, in which a plurality of relative positional relationships between the phased array probe and the welded portion are set, and performs processing to synthesize pieces of the ultrasonic waveform data each having the adjusted origin time to generate synthesized ultrasonic waveform data according to each of the origin time adjustment patterns; and a defect evaluation step that evaluates whether or not the defect is present in the welded portion based on the synthesized ultrasonic waveform data.

\* \* \* \* \*